(12) United States Patent
Onoue

(10) Patent No.: US 10,887,199 B2
(45) Date of Patent: Jan. 5, 2021

(54) PERFORMANCE ADJUSTMENT METHOD, APPARATUS FOR PERFORMANCE ADJUSTMENT, AND NON-TRANSITORY COMPUTER-READABLE STORAGE MEDIUM FOR STORING PROGRAM

(71) Applicant: FUJITSU LIMITED, Kawasaki (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/223,171

(22) Filed: Dec. 18, 2018

(65) Prior Publication Data
US 2019/0245756 A1     Aug. 8, 2019

(30) Foreign Application Priority Data
Feb. 5, 2018   (JP) ................. 2018-018214

(51) Int. Cl.
*H04L 12/24*     (2006.01)
*H04L 29/08*     (2006.01)

(52) U.S. Cl.
CPC ...... *H04L 41/5025* (2013.01); *H04L 41/5035* (2013.01); *H04L 67/101* (2013.01)

(58) Field of Classification Search
CPC ............. H04L 41/5025; H04L 41/5035; H04L 67/101
(Continued)

(56) References Cited

U.S. PATENT DOCUMENTS

| 10,594,562 B1* | 3/2020 | Rastogi ............... H04L 41/0896 |
| 2008/0022159 A1 | 1/2008 | Kato et al. |

(Continued)

FOREIGN PATENT DOCUMENTS

| JP | 2008-27061 A | 2/2008 |
| JP | 2017-138895 A | 8/2017 |

OTHER PUBLICATIONS

U.S. Office Action dated Mar. 5, 2020 for copending U.S. Appl. No. 16/239,594, 14 pages.
(Continued)

*Primary Examiner* — Wing F Chan
*Assistant Examiner* — Leon Y Tseng
(74) *Attorney, Agent, or Firm* — Fujitsu Patent Center

(57) ABSTRACT

A performance adjustment method comprises: executing first processing that includes causing any of a plurality of servers to execute one or more of plural components, each of the plural components being a unit function configured to execute one or more of processes for providing a service; executing second processing that includes acquiring performance information indicating first performance of the service provided by the one or more of the plural components; executing third processing that includes determining whether the first performance indicated by the performance information satisfies a performance requirement, the performance requirement indicating second performance with respect to the service; and executing fourth processing that includes determining, when the first performance does not satisfy the second performance, a first number of components among the plural components, the first number of components indicating components to be additionally executed by a first server that is any of the plurality of servers.

18 Claims, 28 Drawing Sheets

(58) Field of Classification Search
USPC .......................................................... 709/224
See application file for complete search history.

(56) References Cited

U.S. PATENT DOCUMENTS

| | | |
|---|---|---|
| 2010/0318986 A1* | 12/2010 | Burke ..................... G06F 21/16 |
| | | 717/176 |
| 2014/0068611 A1 | 3/2014 | McGrath et al. |
| 2017/0163742 A1 | 6/2017 | Chou et al. |
| 2017/0353541 A1 | 12/2017 | Higashi |
| 2018/0316552 A1 | 11/2018 | Subramani Nadar et al. |
| 2018/0331905 A1 | 11/2018 | Toledo et al. |

OTHER PUBLICATIONS

Notice of Allowance dated Aug. 19, 2020 for copending U.S. Appl. No. 16/239,594, 11 pages.

* cited by examiner

FIG. 16
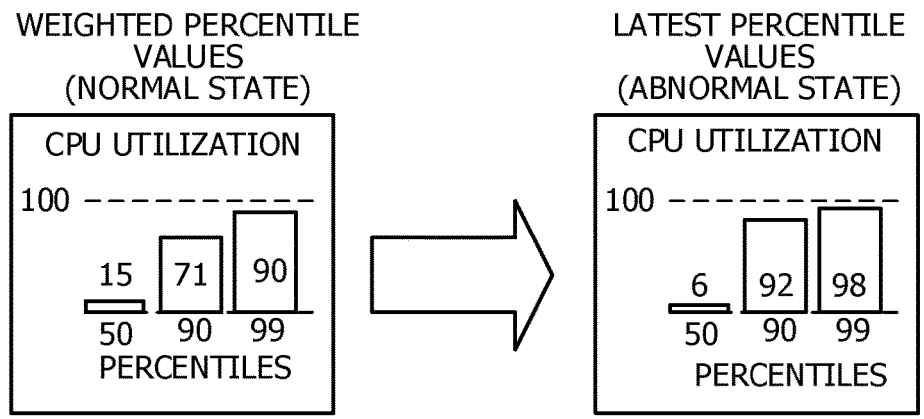
POSITIVE FACTOR DEGREE $F_+ = \Sigma$(INCREASE IN P OF P-TH PERCENTILE WHOSE VALUE INCREASES)×(DIFFERENCE BETWEEN PERCENTILE VALUES)
NEGATIVE FACTOR DEGREE $F_- = \Sigma$(INCREASE IN P OF P-TH PERCENTILE WHOSE VALUE DECREASES)×(DIFFERENCE BETWEEN VALUE OF PERCENTILES)
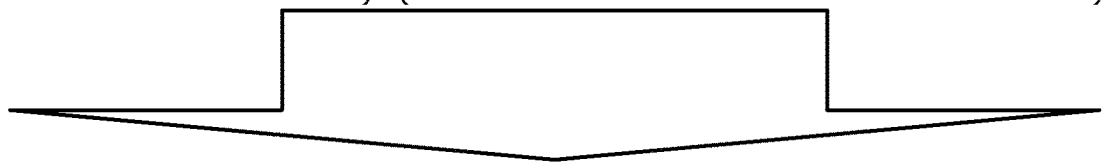
POSITIVE FACTOR DEGREE $F_+ = (90 - 50) \times (92 - 71) + (99 - 90) \times (98 - 90) = 912$
NEGATIVE FACTOR DEGREE $F_- = 50 \times (15 - 6) = 450$

FIG. 17

| CONTAINER $C_{11}$ | | |
|---|---|---|
| METRIC TYPE | POSITIVE FACTOR DEGREE | NEGATIVE FACTOR DEGREE |
| CPU UTILIZATION | 912 ($F_+[CPU(C_{11})]$) | 450 ($F_-[CPU(C_{11})]$) |
| I/O RATE OF MEMORY | 685 ($F_+[memory(C_{11})]$) | 532 ($F_-[CPU(C_{11})]$) |
| TRANSMISSION AND RECEPTION RATE OF NETWORK | 457 ($F_+[network(C_{11})]$) | 235 ($F_-[network(C_{11})]$) |

$|F_+[CPU(C_{11})]| > |F_+[network(C_{21})]| > |F_+[CPU(C_{22})]| > |F_-[CPU(C_{22})]| > ...$

⇩

FACTOR COMPONENT: COMPONENT 1
FACTOR METRIC: CPU UTILIZATION
CONTAINER FACTOR DEGREE CODE: POSITIVE
CONTAINER EXECUTING SERVER: SERVER 1

⇧

141

| SERVER NAME | CONTAINER NAME |
|---|---|
| SERVER 1 | $C_{11}, C_{22}, C_{31}$ |
| SERVER 2 | $C_{12}, C_{32}, C_{41}$ |
| ... | ... |

FIG. 18

| SERVER 1 | | | |
|---|---|---|---|
| METRIC TYPE | POSITIVE FACTOR DEGREE | NEGATIVE FACTOR DEGREE | FACTOR DEGREE CODE |
| CPU UTILIZATION | 765 | 435 | (POSITIVE) |
| I/O RATE OF MEMORY | 265 | 521 | NEGATIVE |
| TRANSMISSION AND RECEPTION RATE OF NETWORK | 567 | 326 | POSITIVE |

FACTOR METRIC: CPU UTILIZATION
CONTAINER EXECUTING SERVER: SERVER 1

SERVER FACTOR DEGREE CODE: POSITIVE

PERFORMANCE ADJUSTMENT METHOD, APPARATUS FOR PERFORMANCE ADJUSTMENT, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-18214, filed on Feb. 5, 2018, the entire contents of which are incorporated herein by reference.

FIELD

The embodiments discussed herein are related to a performance adjustment method, an apparatus•for performance adjustment, and a non-transitory computer-readable storage medium for storing a program for a performance adjustment processing.

BACKGROUND

Cloud computing techniques make it easy to provide computer resources with amounts requested by a user to the user via a network. Cloud computing includes Platform as a Service (PaaS) that provides, via a network to a user, an environment for the use of a platform for the execution of application software (hereinafter referred to as application), for example.

A service that is provided using PaaS may be built based on a technical idea that is referred to as microservices architecture. In the microservices architecture, software for providing a single service is generated so that the software is divided into multiple small applications that are referred to as components. By synthesizing multiple components with each other to provide a single service, processing power may be increased on a component basis. Thus, when a process load of a certain component is excessively high, it is sufficient if processing power of the certain component is increased, and processing power of the other components is not changed.

Execution units of the components are referred to as containers. To increase processing power of a component, an administrator increases the number of containers for the component for which the processing power is to be increased (scale out process). Since the number of containers is increased or reduced to adjust performance of a service, system resources may be efficiently consumed. A PaaS system using such containers is referred to as container-based PaaS platform.

As a technique related to improvement in the efficiency of using resources, there is a virtualization environment management system for suppressing the consumption of excess resources in a virtual environment and enabling an efficient system operation.

An example of related art is Japanese Laid-open Patent Publication No. 2017-138895.

SUMMARY

According to an aspect of the embodiments, a performance adjustment method comprises: executing first processing that includes causing any of a plurality of servers to execute one or more of plural components, each of the plural components being a unit function configured to execute one or more of processes for providing a service; executing second processing that includes acquiring performance information indicating first performance of the service provided by the one or more of the plural components; executing third processing that includes determining whether the first performance indicated by the performance information satisfies a performance requirement, the performance requirement indicating second performance with respect to the service; and executing fourth processing that includes determining, when the first performance indicated by the performance information does not satisfy the second performance indicated by the performance requirement, a first number of components among the plural components, the first number of components indicating components to be additionally executed by a first server that is any of the plurality of servers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an example of the calculation of factor degrees;

FIG. 17 is a diagram illustrating an example of the estimation of a factor component;

FIG. 18 is a diagram illustrating an example of the determination of a server factor degree code;

DESCRIPTION OF EMBODIMENTS

An administrator of a cloud computing system adjusts performance of components for enabling a service so that the quality of the service is maintained. For example, when the administrator determines, as a performance requirement, the maximum value of latency of the service upon the provision of the service and the latency of the service exceeds the maximum value, the administrator increases processing power for the execution of the components used to provide the service. When the service does not satisfy the performance requirement, and a component that causes a decrease in the performance is clarified among the multiple components used to provide the service, it is sufficient if the administrator increases the number of containers for the component causing the decrease in the performance.

In the related-art technique, however, an appropriate number of containers to be added to increase processing power is not clarified. When the number of containers to be added is too small, the performance requirement may not be satisfied. When the number of containers to be added is too large, a resource of the related-art system may be excessively consumed and the efficiency of operating the related-art system may decrease.

A problem with the difficulty in determining an appropriate increase in processing power may occur in not only a service generated based on a microservices architecture but also a service for which a certain performance requirement is requested.

According to an aspect, the present disclosure aims to determine an appropriate increase in processing power.

Hereinafter, embodiments are described with reference to the accompanying drawings. Two or more of the embodiments may be combined without any contradiction.

First Embodiment

First, a first embodiment is described below.

Figure 1:
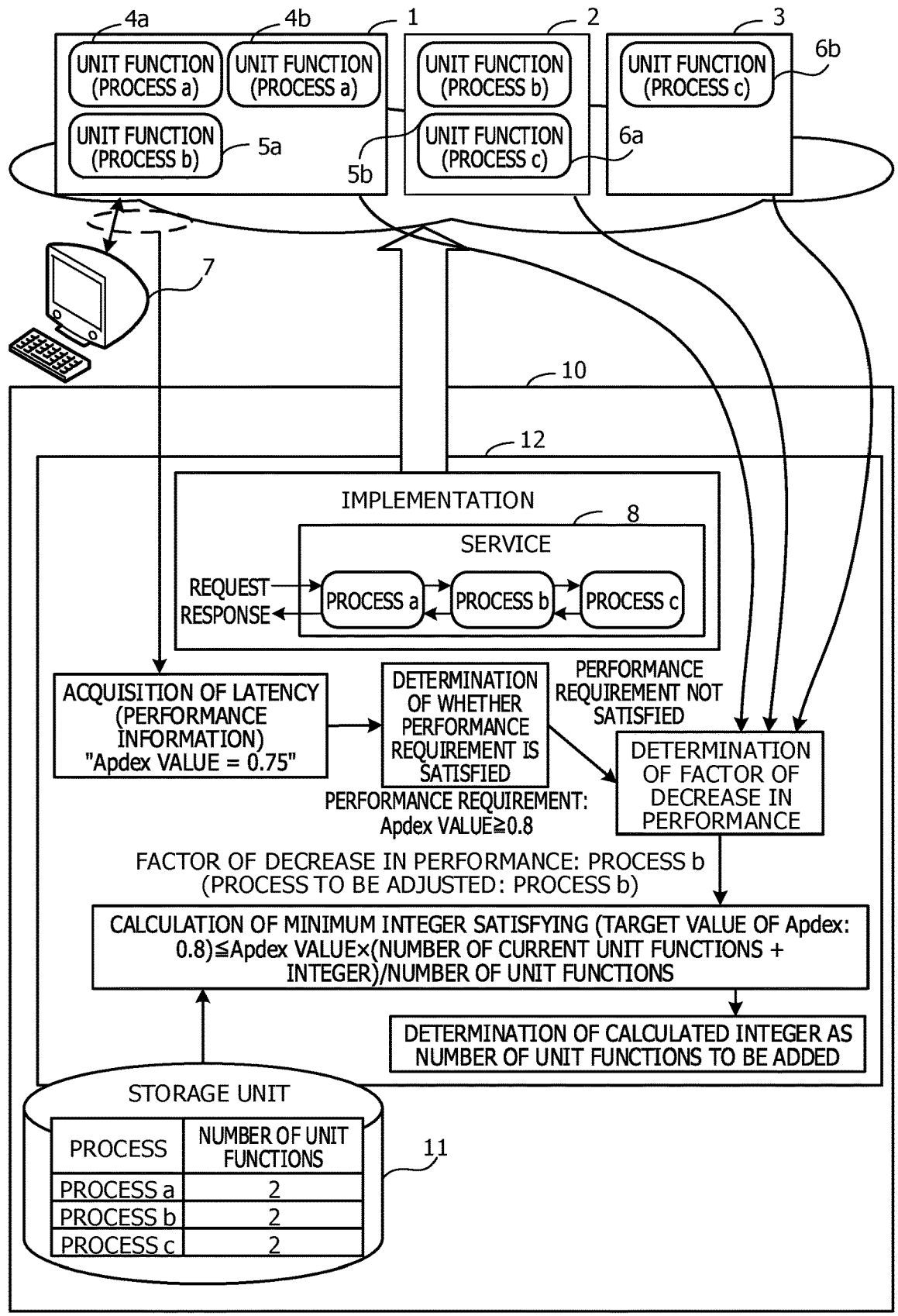
FIG. 1 is a diagram illustrating an example of a process according to a first embodiment.

FIG. 1 is a diagram illustrating an example of a process according to the first embodiment. A managing device 10 is connected to multiple servers 1 to 3 via, for example, a network. The servers 1 to 3 are computers configured to coordinate with each other to provide a service 8 to a terminal device 7. For example, the servers 1 to 3 cause multiple processes ("process a", "process b", and "process c") to coordinate with each other so as to provide the service 8. Each of the processes is executed by one or more of unit functions 4a, 4b, 5a, 5b, 6a, and 6b of executing the processes with predetermined processing performance.

Each of the unit functions 4a, 4b, 5a, 5b, 6a, and 6b are enabled by any of the servers 1 to 3. A single server may enable multiple unit functions of executing the same process. For example, when a single server executes a process with processing performance that is twice as high as the predetermined processing performance, two unit functions are implemented in the single server. For example, the servers 1 to 3 may use a single process to execute the unit functions 4a, 4b, 5a, 5b, 6a, and 6b. The servers 1 to 3 may use a single virtual machine to execute the unit functions 4a, 4b, 5a, 5b, 6a, and 6b.

The managing device 10 is a computer configured to manage the servers 1 to 3. The managing device 10 includes a storage unit 11 and a processing unit 12 in order to manage the servers 1 to 3. The storage unit 11 is, for example, a memory or a storage device. The processing unit 12 is, for example, a processor or an arithmetic circuit.

The storage unit 11 stores the numbers of unit functions of the processes. In the example illustrated in FIG. 1, the number of unit functions of each of the "process a", the "process b", and the "process c" is "2".

The processing unit 12 controls the servers 1 to 3 and causes one or more of the servers 1 to 3 to execute the processes to be used to provide the service 8. When the quality of the service 8 provided by the servers 1 to 3 decreases, the processing unit 12 adjusts a processing function of executing the processes to be used to provide the service 8.

For example, the processing unit 12 implements, in the servers 1 to 3, a function of executing the service 8. For example, the processing unit 12 causes each of the unit functions 4a, 4b, 5a, 5b, 6a, and 6b to be enabled by any of the servers 1 to 3. The unit functions 4a, 4b, 5a, 5b, 6a, and 6b are functions of executing the processes with the predetermined processing performance. Then, the processing unit 12 causes the servers 1 to 3 to use the unit functions 4a, 4b, 5a, 5b, 6a, and 6b to execute the processes.

After that, the processing unit 12 acquires performance information indicating performance of the service 8 provided using the processes. For example, the performance information indicates latency from the time when the terminal 7 transmits a request to the time when the terminal 7 receives a response to the request. For example, the processing unit 12 calculates a performance index value such as Apdex based on latency from the transmission of multiple requests to the reception of responses to the requests. Apdex is described later.

The processing unit 12 determines whether or not the acquired performance information satisfies a performance requirement (determination of whether or not the performance requirement is satisfied). For example, the performance requirement indicates that Apdex is equal to or larger than 0.8. In this case, the processing unit 12 determines whether or not the Apdex value calculated based on the acquired performance information is equal to or larger than 0.8.

When the performance information does not satisfy the performance requirement, the processing unit 12 acquires first state information indicating execution states of the multiple processes in a latest predetermined time period. In addition, the processing unit 12 acquires second state information indicating execution states of the multiple processes when the performance of the service 8 satisfies the performance requirement. Then, the processing unit 12 calculates, based on the first state information and the second state information, differences between the execution states of the processes when the performance information satisfies the performance requirement and the execution states of the processes when the performance information does not satisfy the performance requirement.

The processing unit 12 determines, based on the calculated differences between the execution states of the multiple processes, a process causing a decrease in the performance of the service 8. For example, the processing unit 12 determines, as the process causing the decrease in the performance of the service 8, a process in which the difference between state information when the performance of the service 8 satisfies the performance requirement and state information when the performance of the service 8 does not satisfy the performance requirement is the largest. The processing unit 12 determines, as a process to be adjusted, the process causing the decrease in the performance of the service 8.

When the performance information does not satisfy the performance requirement, the processing unit 12 determines, based on the performance information of the service 8 and the number of current unit functions of the process to be adjusted, the number of unit functions that are to be added for the process to be adjusted and are to be enabled by any of the servers 1 to 3. For example, the processing unit 12 divides a performance value (for example, Apdex value) calculated from the performance information by the number of current unit functions of the process to be adjusted, thereby calculating a contribution to a performance value per unit function. Then, the processing unit 12 determines, as the number of unit functions to be added, the minimum integer causing a value, which is obtained by multiplying the contribution by a value obtained by adding the integer to the number of current unit functions, to be equal to or larger than a threshold indicated as the performance requirement.

After the processing unit 12 determines the number of unit functions to be added, the processing unit 12 determines, for each of the determined number of unit functions to be added, a server for enabling the unit function among the servers 1 to 3. For example, the processing unit 12 determines, for each of the determined number of unit functions to be added, a server that enables the unit function and has the minimum excess resource amount when the processing unit 12 causes each of the determined number of unit functions to be enabled by any of the servers 1 to 3. For example, the processing unit 12 divides the total of numerical values indicating the amounts of resources included in each of the servers and consumed by current unit functions of each of the servers by a value obtained by adding the number of current unit functions of each of the servers to the number of unit functions to be added to each of the servers. The processing unit 12 treats the results of the division as resource amounts to be consumed per unit function. Then, the processing unit 12 calculates, based on the resource amounts to be consumed per unit function, excess resource amounts of the servers 1 to 3 when each of the determined number of unit functions is enabled by any of the servers 1 to 3.

For example, the processing unit 12 multiplies, for each of processes included in each of the servers 1 to 3 and to be adjusted, the total number of unit functions enabled by the server after the addition of a single unit function to the server by a resource amount consumed per unit function and calculated for the server. Then, the processing unit 12 adds the result of the multiplication to a resource amount included in the server and consumed by a process other than unit functions of the process to be adjusted and treats the result of the addition as a resource amount to be consumed after the addition of the unit function. Then, the processing unit 12 calculates an excess resource amount by subtracting the resource amount to be consumed after the addition of the unit function from a resource amount to be consumed in the server after the addition of the unit function. The processing unit 12 determines a server that will have the maximum excess resource amount after the addition of the unit function. The processing unit 12 causes the determined server to enable the unit function. Thus, an excess resource amount of a server that will have the minimum excess resource amount after the addition of a unit function may be maximized. When units of resource amounts are normalized, the processing unit 12 may determine, as a server that will have the maximum excess resource amount after the addition of a unit function, a server that will have the minimum resource amount to be consumed after the addition of the unit function.

After the processing unit 12 determines one or multiple servers for enabling the determined number of unit functions, the processing unit 12 controls the servers 1 to 3 in accordance with the determination so that each of the determined number of unit functions is enabled by any of the servers 1 to 3. For example, the processing unit 12 instructs the servers 1 to 3 to activate a program for executing the processes to be adjusted.

In the first embodiment, when the service 8 does not satisfy the performance requirement, the processing unit 12 may calculate the number (or an appropriate increase in processing power) of unit functions to be added so as to satisfy the performance requirement and increase the processing power. Then, the processing unit 12 additionally implements an appropriate number of unit functions in one or more of the servers 1 to 3 at once, thereby quickly increasing the processing power and resolving, within a short time period, a state in which the performance requirement is not satisfied.

In addition, the processing unit 12 causes a server, which has the maximum excess resource amount after the addition of a unit function, to enable the unit function. This may equally distribute loads of the servers 1 to 3 and maximize an excess resource amount of a server that has the minimum excess resource amount after the addition of the unit function.

When the performance information of the service 8 does not satisfy the performance requirement, the processing unit 12 determines a process causing a decrease in the performance. When the process causing the decrease in the performance is clarified, this determination process may not be executed. For example, when a process that is a bottleneck is clarified based on a past operation, the process may be treated as a process to be adjusted in the processing unit 12. In this case, when the performance information of the server 8 does not satisfy the performance requirement, the processing unit 12 does not determine the process causing the decrease in the performance and executes a process of additionally implementing a unit function for the process to be adjusted.

Second Embodiment

Next, a second embodiment is described. The second embodiment describes a computer system configured to manage an operation of PaaS built based on a microservices architecture. The computer system according to the second embodiment appropriately determines the number of containers to be added for a component causing an excessive load when latency of a service exceeds the maximum value of the latency.

Figure 2:
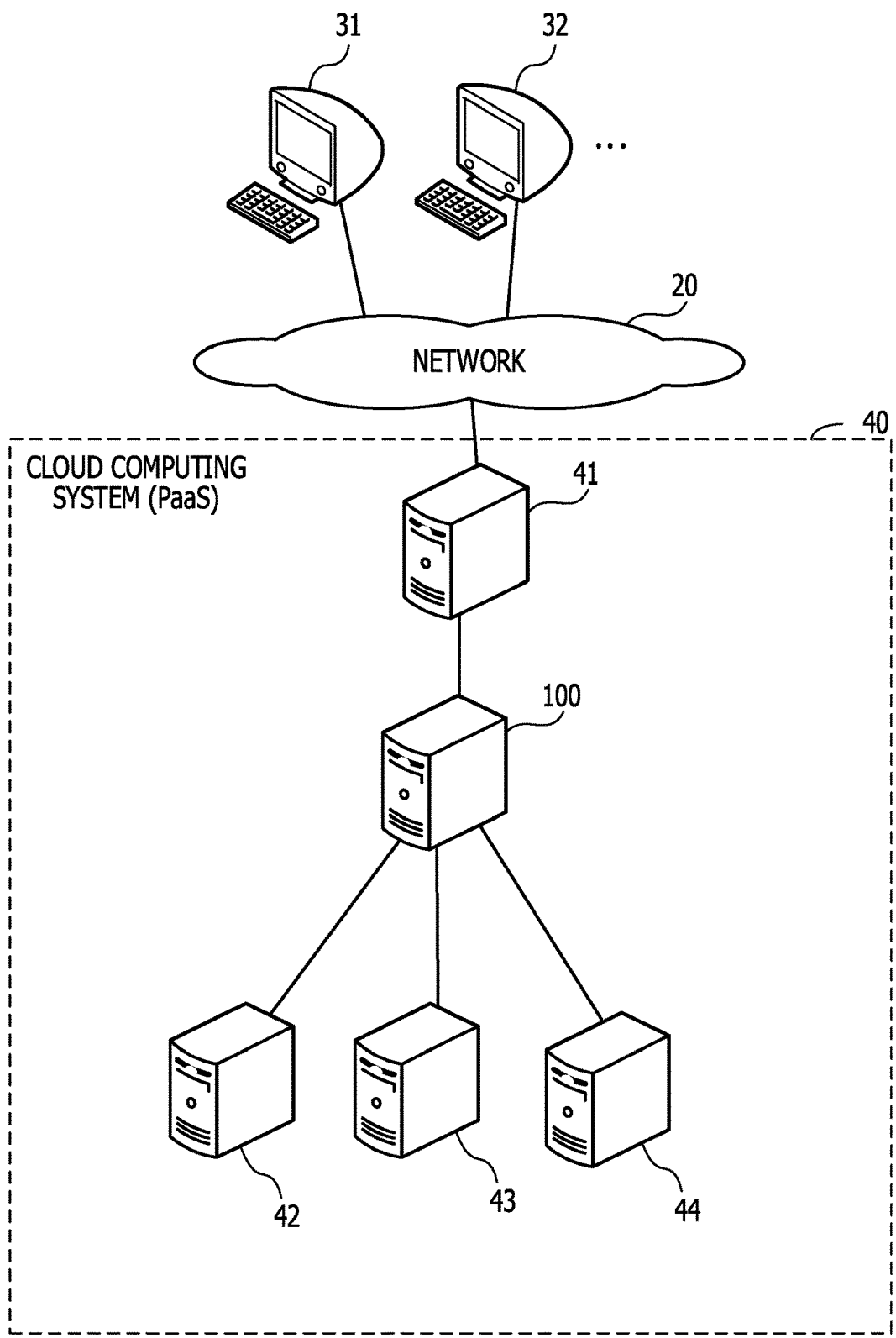
FIG. 2 is a diagram illustrating an example of a configuration of a system according to a second embodiment.

FIG. 2 illustrates an example of a configuration of the system according to the second embodiment. A cloud computing system 40 is connected to multiple terminal devices 31, 32, . . . via a network 20. The cloud computing system 40 provides a service based on PaaS to the terminal devices 31, 32, . . . .

The cloud computing system 40 includes a gateway 41, a managing server 100, and multiple servers 42 to 44. The gateway 41 is connected to the network. 20 and configured to receive requests from the terminal devices 31, 32, . . . . The managing server 100 is connected to the gateway 41 and the multiple servers 42 to 44 and configured to manage the multiple servers 42 to 44. The multiple servers 42 to 44 are configured to provide an information processing service in accordance with requests from the terminal devices 31, 32, . . . .

Figure 3:
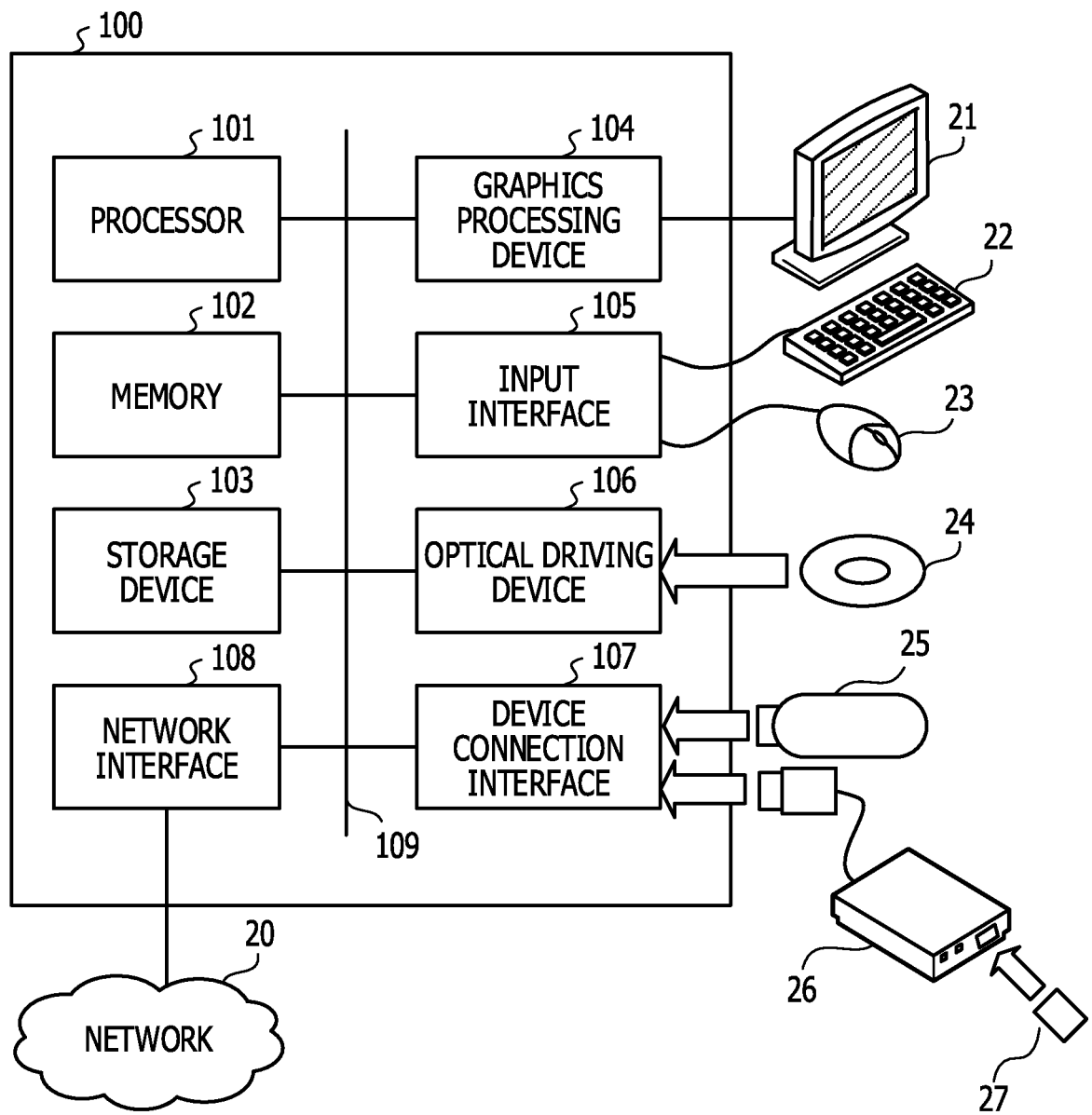
FIG. 3 is a diagram illustrating an example of a hardware configuration of a managing server.

FIG. 3 is a diagram illustrating an example of a hardware configuration of the managing server. The entire managing server 100 is controlled by a processor 101. The processor 101 is connected to a memory 102 and multiple peripheral devices via a bus 109. The processor 101 may be a multiprocessor. The processor 101 is, for example, a central processing unit (CPU), a micro processing unit (MPU), or a digital signal processor (DSP). One or more of functions to be enabled by causing the processor 101 to execute a program may be enabled by an electronic circuit such as an application specific integrated circuit (ASIC) or a programmable logic device (PLD).

The memory 102 is used as a main storage device of the managing server 100. In the memory 102, either or both of an operating system (OS) program to be executed by the processor 101 and an application program to be executed by the processor 101 is or are temporarily stored. In the memory 102, data of various types that is used for a process to be executed by the processor 101 is stored. As the memory 102, a volatile semiconductor storage device such as a random access memory (RAM) is used.

Examples of the peripheral devices connected to the bus 109 are a storage device 103, a graphics processing device 104, an input interface 105, an optical driving device 106, a device connection interface 107, and a network interface 108.

The storage device 103 electrically or magnetically writes and reads data to and from a recording medium included in the storage device 103. The storage device 103 is used as an auxiliary storage device of the managing server 100. In the storage device 103, the OS program, the application program, and the data of the various types are stored. As the storage device 103, a hard disk drive (HDD) or a solid state drive (SSD) may be used.

The graphics processing device 104 is connected to a monitor 21. The graphics processing device 104 causes an image to be displayed on a screen of the monitor 21 in accordance with a command from the processor 101. Examples of the monitor 21 are a liquid crystal display and an organic electroluminescence (EL) display device.

The input interface 105 is connected to a keyboard 22 and a mouse 23. The input interface 105 transmits signals received from the keyboard 22 and the mouse 23 to the processor 101. The mouse 23 is an example of a pointing device. Another pointing device may be used instead of the mouse 23. The other pointing device is a touch panel, a tablet, a touch pad, a trackball, or the like.

The optical driving device 106 uses laser light or the like to read data recorded in an optical disc 24. The optical disc 24 is a portable recording medium for storing data readable by light reflection. Examples of the optical disc 24 are a digital versatile disc (DVD), a DVD-ROM, a compact disc read only memory (CD-ROM), a compact disc-recordable (CD-R), and a compact disc-rewritable (CD-RW).

The device connection interface 107 is a communication interface configured to connect the peripheral devices to the managing server 100. For example, a memory device 25 and a memory reader and writer 26 may be connected to the device connection interface 107. The memory device 25 is a recording medium having a function of communicating with the device connection interface 107. The memory reader and writer 26 is a device configured to write data to a memory card 27 and read data from the memory card 27. The memory card 27 is a card-type recording medium.

The network interface 108 is connected to the network 20. The network interface 108 transmits and receives data to and from another computer or a communication device via the network 20.

Processing functions of the managing server 100 according to the second embodiment may be enabled by the aforementioned hardware configuration. The terminal devices 31, 32, . . . , the gateway 41, and the servers 42 to 44 may be enabled by the same hardware as the managing server 100. The managing device 10 described in the first embodiment may be enabled by the same hardware as the managing server 100 illustrated in FIG. 3.

The managing server 100 enables the processing functions according to the second embodiment by executing a program stored in a computer-readable recording medium, for example. The program in which details of processes to be executed by the managing server 100 are described may be recorded in various recording media. For example, the program to be executed by the managing server 100 may be stored in the storage device 103. The processor 101 loads the entire program stored in the storage device 103 or a portion of the program stored in the storage device 103 into the memory 102 and executes the program. The program to be executed by the managing server 100 may be recorded in a portable recording medium such as the optical disc 24, the memory device 25, or the memory card 27. The program stored in the portable recording medium may be installed in the storage device 103 and executed under control by the processor 101. The processor 101 may read the program directly from the portable recording medium and execute the program.

In the second embodiment, software for providing a service based on the microservices architecture is implemented in the servers 42 to 44.

Figure 4:
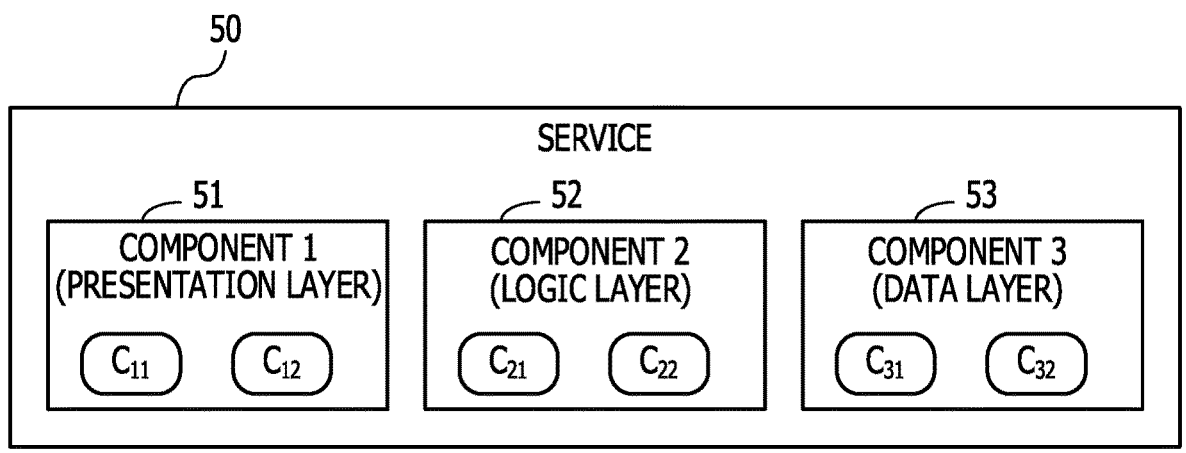
FIG. 4 is a diagram illustrating the concept of a microservices architecture.

FIG. 4 is a diagram illustrating the concept of the microservices architecture. A service 50 to be provided to a user is enabled using multiple components 51 to 53. For example, the component 51 is software for executing a process of the presentation layer, the component 52 is software for executing a process of the logic layer, and the component 53 is software for executing a process of the data layer.

Each of the components 51 to 53 is executed by one or more of the multiple servers 42 to 44. Processing functions built in the servers 42 to 44 by the execution of the components 51 to 53 are containers. In the second embodiment, each of the containers is expressed by "$C_{xy}$". An index "x" of the container is an identification number (component number) of a component including the container, and an index "y" of the container is an identification number (container number) of the container included in the component.

In the microservices architecture, software for providing the single service 50 is generated so that the software is divided into the multiple small components 51 to 53. The components 51 to 53 are sparsely coupled. The sparse coupling indicates that the components 51 to 53 are relatively loosely coupled to each other and highly independent of each other. Since the components 51 to 53 are sparsely coupled, there is an advantage in that a change in a component due to the addition of a new component or the expansion of another component is small.

Each of the components 51 to 53 of the service generated based on the microservices architecture is executed by one or more containers. Thus, each of the components 51 to 53 has a one-to-one or one-to-many relationship with one or more containers.

A performance requirement for the service 50 to be provided to the user may be expressed using latency, for example. Thus, an administrator of the system prepares the components 51 to 53 with processing power sufficient to enable latency requested for the service 50. The processing power of the components 51 to 53 may be adjusted by increasing or reducing the numbers of containers for executing the components 51 to 53.

It is easy for the administrator to define the performance requirement requested for the service 50. It is, however, difficult for the administrator to determine resources to be assigned to the components so that the latency requested for the service 50 is satisfied. In the second embodiment, the managing server 100 detects a component with insufficient performance, adds a container for executing the component, and assigns a resource to the component so that the performance requirement for the service 50 is satisfied.

Figure 5:
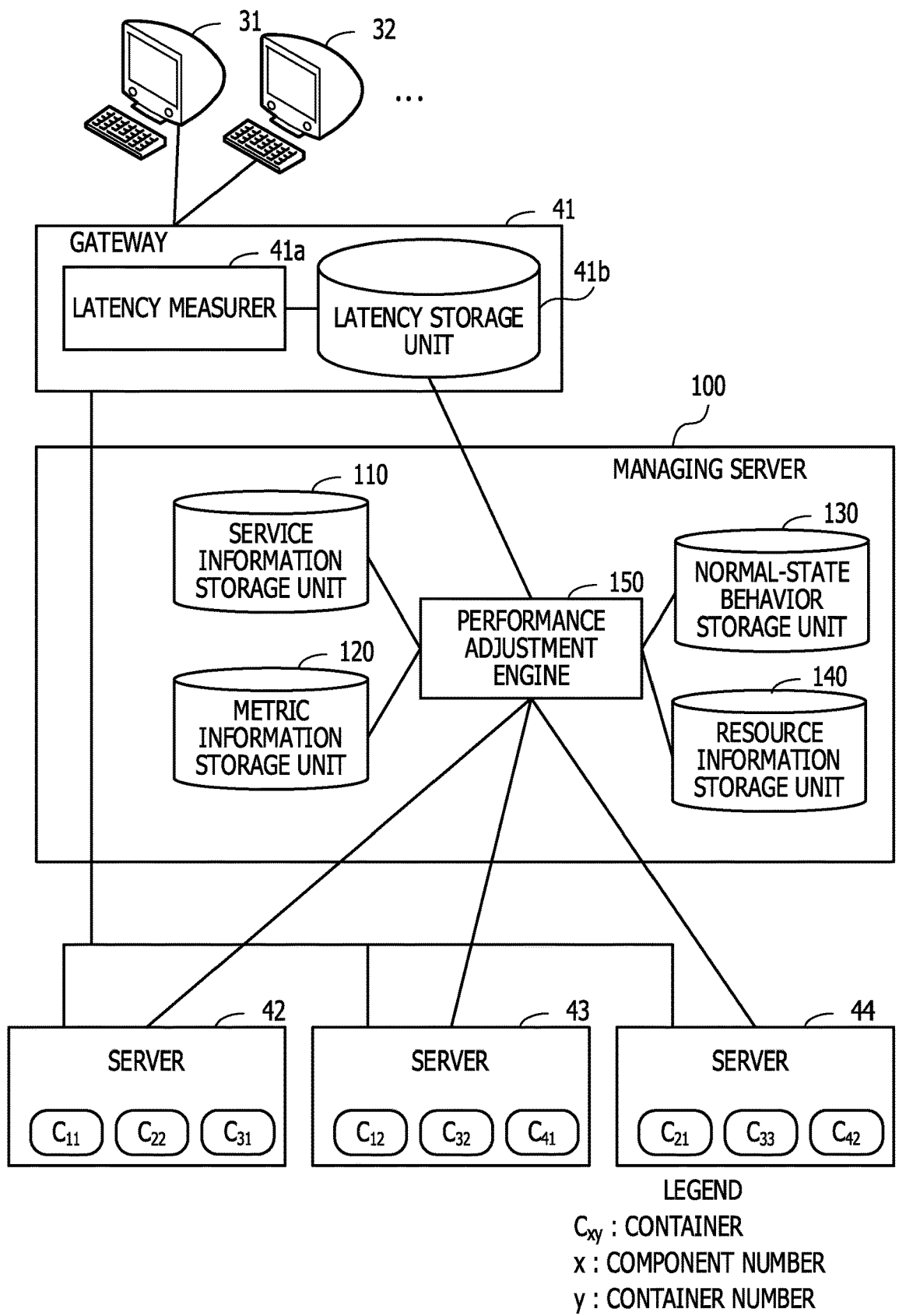
FIG. 5 is a block diagram illustrating functions included in a gateway and the managing server and used to adjust performance.

FIG. 5 is a block diagram illustrating functions included in the gateway and the managing server and used to adjust performance. The gateway 41 includes a latency measurer 41a and a latency storage unit 41b. The latency measurer 41a measures time periods from the reception of requests from the terminal devices 31, 32, . . . to the transmission of responses to the requests to the terminal devices 31, 32, . . . . The latency measurer 41a causes the measured time periods to be stored in the latency storage unit 41b as latency for services to be provided in accordance with the requests. The latency storage unit 41b stores the latency measured by the latency measurer 41a.

The managing server 100 includes a service information storage unit 110, a metric information storage unit 120, a normal-state behavior storage unit 130, a resource information storage unit 140, and a performance adjustment engine 150. The service information storage unit 110 stores information on services to be provided. The metric information storage unit 120 stores information (metrics) on operational states of resources consumed by the servers 42 to 44 and containers. The normal-state behavior storage unit 130 stores information indicating behaviors of multiple containers in a normal state and behaviors of the multiple servers in the normal state. The resource information storage unit 140 stores information on resources consumed by the servers 42 to 44. The performance adjustment engine 150 uses the information stored in the service information storage unit 110, the metric information storage unit 120, the normal-state behavior storage unit 130, and the resource information storage unit 140 to adjust the performance on a component basis.

In the following description, the implementation of a container for executing a process of a component in a server is referred to as container deployment. The container deployment is a process of installing a program for executing the component in the server and activating a process for executing the process of the component based on the program. The implementation of the container in the server indicates the deployment of the container in the server.

In the example illustrated in FIG. 5, in each of the servers 42 to 44, multiple containers for executing different components are deployed. For example, containers $C_{11}$, $C_{22}$, and $C_{31}$ are deployed in the server 42.

The information stored in the service information storage unit 110, the information stored in the metric information storage unit 120, the information stored in the normal-state behavior storage unit 130, and the information stored in the resource information storage unit 140 are described below in detail with reference to FIGS. 6 to 10.

Figure 6:
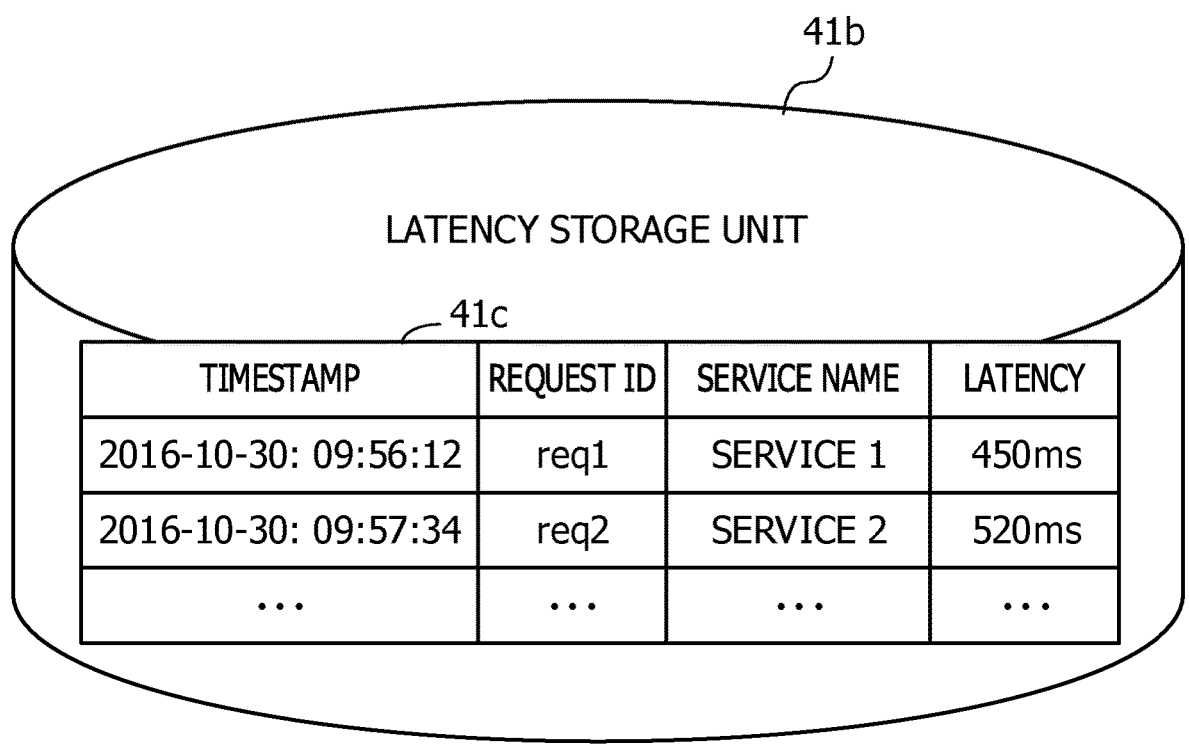
FIG. 6 is a diagram illustrating an example of information stored in a latency storage unit.

FIG. 6 is a diagram illustrating an example of the information stored in the latency storage unit. The latency storage unit 41b stores a latency management table 41c, for example. The latency management table 41c includes fields for time stamps, request IDs, service IDs, and latency.

In the field for timestamps, time and dates when the latency has been measured are set. In the field for request IDs, identification information (request IDs) of requests for which the latency has been measured is set. In the field for service names, the names (service names) of services corresponding to the requests for which the latency has been measured are set. In the field for latency, the measured latency is set.

Figure 7:
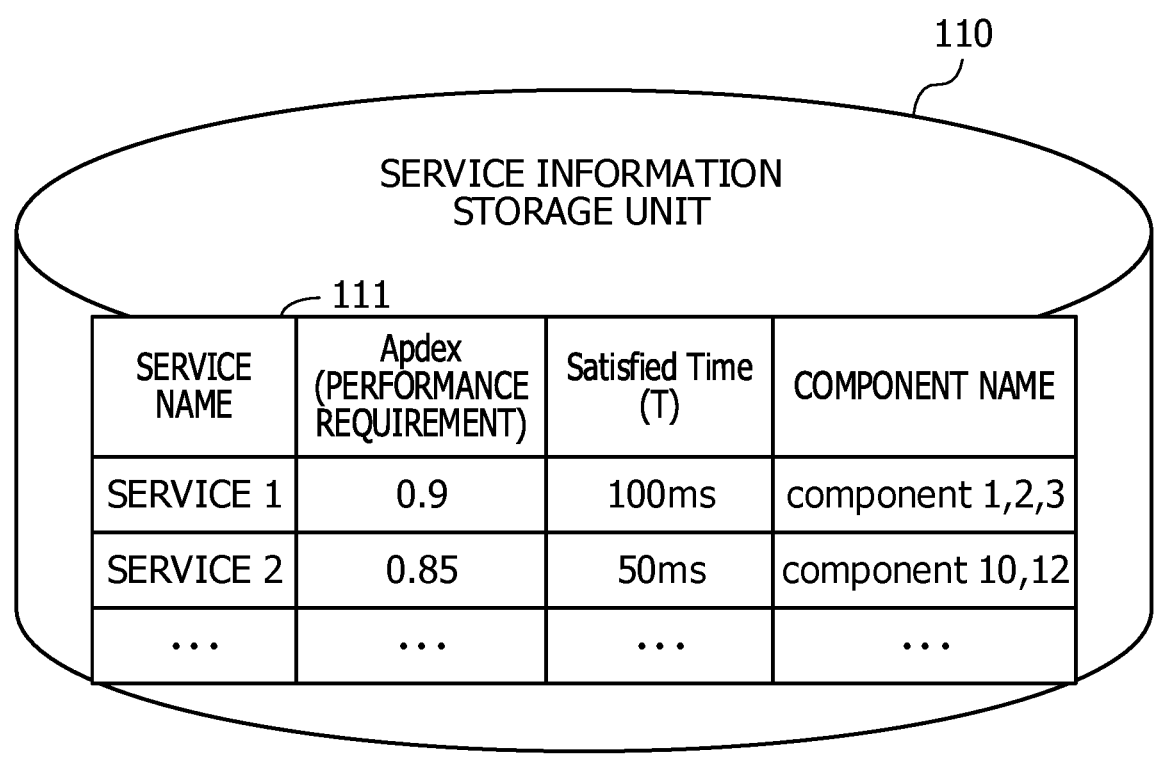
FIG. 7 is a diagram illustrating an example of information stored in a service information storage unit.

FIG. 7 is a diagram illustrating an example of the information stored in the service information storage unit. The service information storage unit 110 stores a service management table 111, for example. The service management table 111 includes fields for service names, application performance indices (Apdex), satisfied time, and component names. In the field for service names, the names (service names) of services being provided are set. In the field for Apdex, performance requirements for the services are set as Apdex. Apdex is indices indicating levels of satisfaction of the user with latency. In the field for satisfied time, the maximum latency values (T) with which the user who uses the services is considered to be satisfied. In the field for component names, the names of components used to provide the services are set.

Apdex is described below in detail. Apdex is an index standardized by "The Alliance" and is calculated according to the following equation. Apdex=((satisfied counts)+(tolerating counts)/2)/(total counts). "Satisfied counts" is the number of requests for which latency that is equal to or shorter than T is obtained. For example, "satisfied counts" is the number of requests for which latency satisfied by the user is obtained.

"Tolerating counts" is the number of requests for which latency that is longer than T and equal to or shorter than 4×T is obtained. "Tolerating counts" is the number of requests for which latency that is not satisfied by the user but is acceptable is obtained.

The number of requests for which latency that is longer than 4×T is obtained is referred to as "frustrated". "Frustrated" is the number of requests for which latency unsatisfied by the user is obtained.

In the second embodiment, when an Apdex value calculated based on latency of a service is equal to or larger than an Apdex value set as a performance requirement for the service, it is determined that the service satisfies the performance requirement. On the other hand, when the Apdex value calculated based on the latency of the service is smaller than the Apdex value set as the performance requirement, it is determined that the service does not satisfy the performance requirement.

Figure 8:
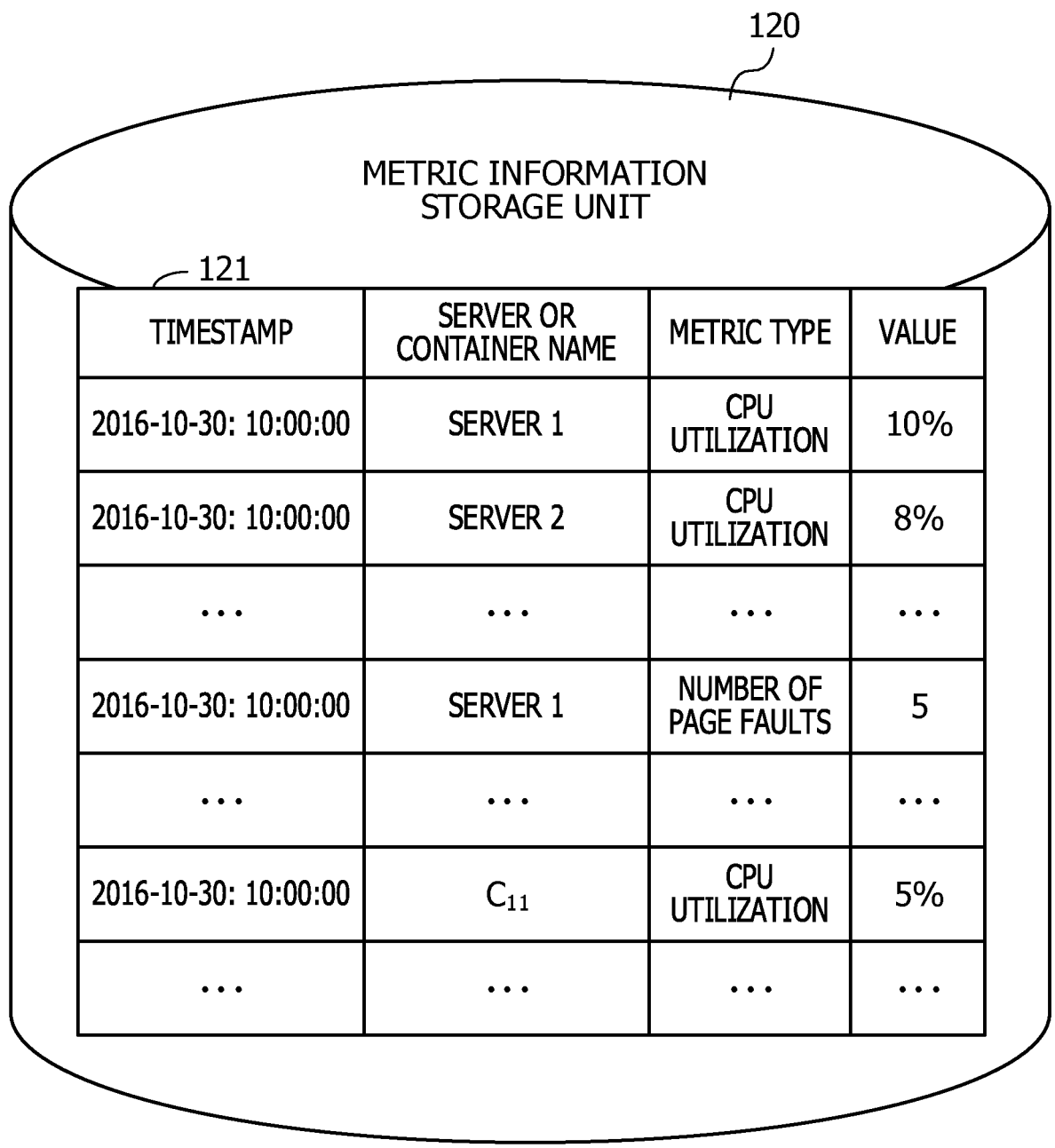
FIG. 8 is a diagram illustrating an example of information stored in a metric information storage unit.

FIG. 8 is a diagram illustrating an example of the information stored in the metric information storage unit. The metric information storage unit 120 stores a metric management table 121, for example. The metric management table 121 includes fields for time stamps, server or container names, metric types, and values. In the field for timestamps, time and dates when metric values have been measured are set. In the field for server or container names, the names of servers or containers that have measured the metric values are set. In the field for metric types, types (metric types) of the measured metric values are set. In the field for values, the measured metric values are set.

Figure 9:
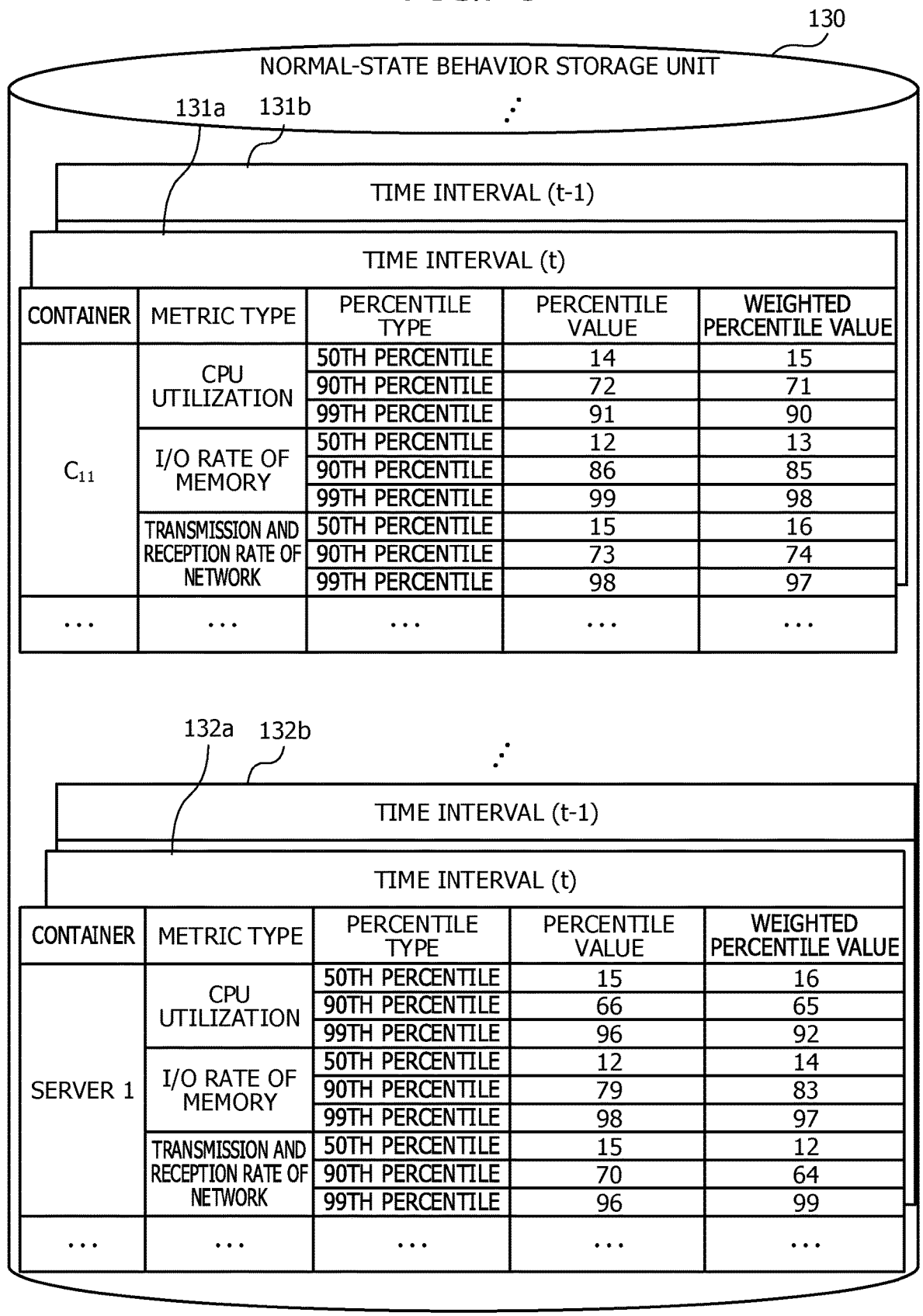
FIG. 9 is a diagram illustrating an example of information stored in a normal-state behavior storage unit.

FIG. 9 is a diagram illustrating an example of the information stored in the normal-state behavior storage unit. The normal-state behavior storage unit 130 stores multiple container behavior management tables 131a, 131b, . . . for behavior measurement time intervals and multiple server behavior management tables 132a, 132b . . . for behavior measurement time intervals.

The multiple container behavior management tables 131a, 131b, . . . are associated with the measurement time intervals in which behaviors of containers are measured. The multiple container behavior management tables 131a, 131b, . . . include fields for containers, metric types, percentile types, percentile values, and weighted percentile values. In the fields for containers, the names (container names) of containers of which behaviors are to be measured are set. In the fields for metric types, types of metrics in which the behaviors have been measured are set. In the fields for percentile types, types of percentiles calculated for metric values are set. For example, 50th percentiles, 90th percentiles, 99th percentiles, and the like are set as the percentile types. In the fields for percentile values, percentile values indicated by the percentile types for the corresponding metric types are set. In the weighted percentile values, percentile values weighted for the metrics of the containers based on metric values for past several time intervals are set. The weighted percentile values are described later in detail (refer to FIG. 15).

The multiple server behavior management tables 132a, 132b, . . . are associated with the measurement time intervals in which behaviors of servers are measured. The multiple server behavior management tables 132a, 132b, . . . include fields for servers, metric types, percentile types, percentile values, and weighted percentile values. In the fields for servers, the names (server names) of servers of which behaviors are to be measured are set. In the fields for metric types, types of metrics in which the behaviors have been measured are set. In the fields for percentile types, types of percentiles calculated for metric values are set. For example, 50th percentiles, 90th percentiles, 99th percentiles, and the like are set as the types of the percentiles. In the fields for percentile values, percentile values indicated by the percentile types for the corresponding servers are set. In the fields for weighted percentile values, percentile values weighted for the metrics of the servers based on metric values for past several time intervals are set.

The percentiles are one type of representative statistical values. When multiple data items are placed in order from the largest data item to the smallest data item, the ratio of the number of data items smaller than a value x (x is a real number) to all the data items is equal to or lower than p % (p is a real number equal to or larger than 0 and equal to or smaller than 100), and the ratio of the number of data items larger than the value x to all the data items is (100-p) %, the value x is a p-th percentile.

Figure 10:
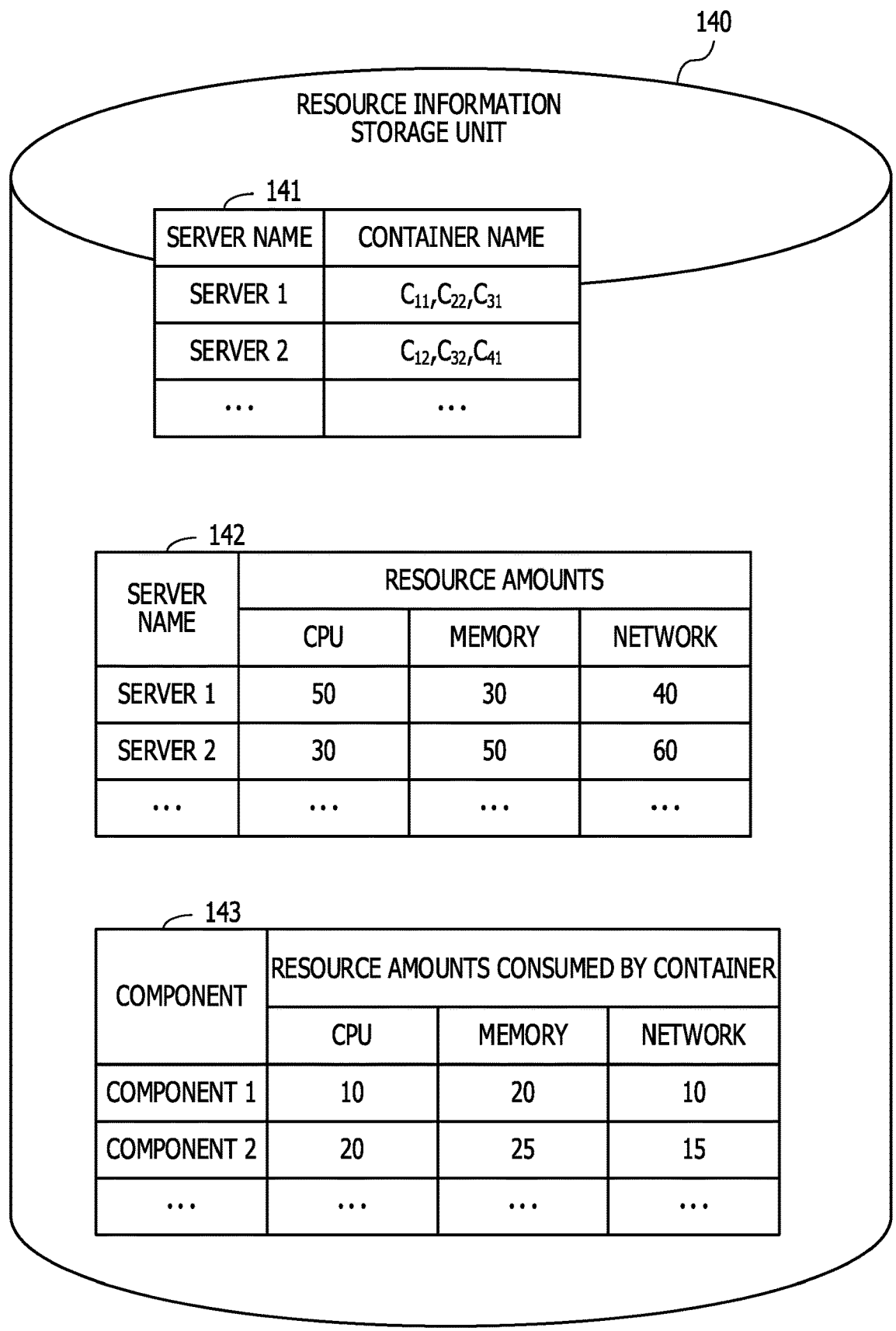
FIG. 10 is a diagram illustrating an example of information stored in a resource information storage unit.

FIG. 10 is a diagram illustrating an example of the information stored in the resource information storage unit. The resource information storage unit 140 stores a container deployment management table 141, a server resource management table 142, and a container resource management table 143, for example.

The container deployment management 141 is a data table to be used to manage deployment states of containers in the servers 42 to 44. The container deployment management 141 includes fields for server names and container names. In the field for server names, the names (server names) of servers in which containers are implemented are set. In the field for containers, the names (container names) of the containers implemented in the servers are set.

The server resource management table 142 is a data table to be used to manage the amounts of resources of the servers 42 to 44. The server resource management table 142 includes fields for server names and resource amounts. In the field for server names, the names (server names) of servers used to provide the service are set. In the field for resource amounts, resource amounts of the servers are set for types of the resources. In the example illustrated in FIG. 10, the amounts of resources, which are CPUs, memories, and the network, are set.

The container resource management table 143 is a data table to be used to manage resource amounts consumed by containers of components. The container resource management table 143 includes fields for components and resource amounts consumed by a container. In the field for components, the names (component names) of components used to provide the service are set. In the field for resource amounts consumed by a container, resource amounts consumed by containers of the components are set for the resource types. In the example illustrated in FIG. 10, the amounts of resources, which are the CPUs, the memories, and the network and are consumed by the containers, are set.

Next, the performance adjustment engine 150 is described in detail.

Figure 11:
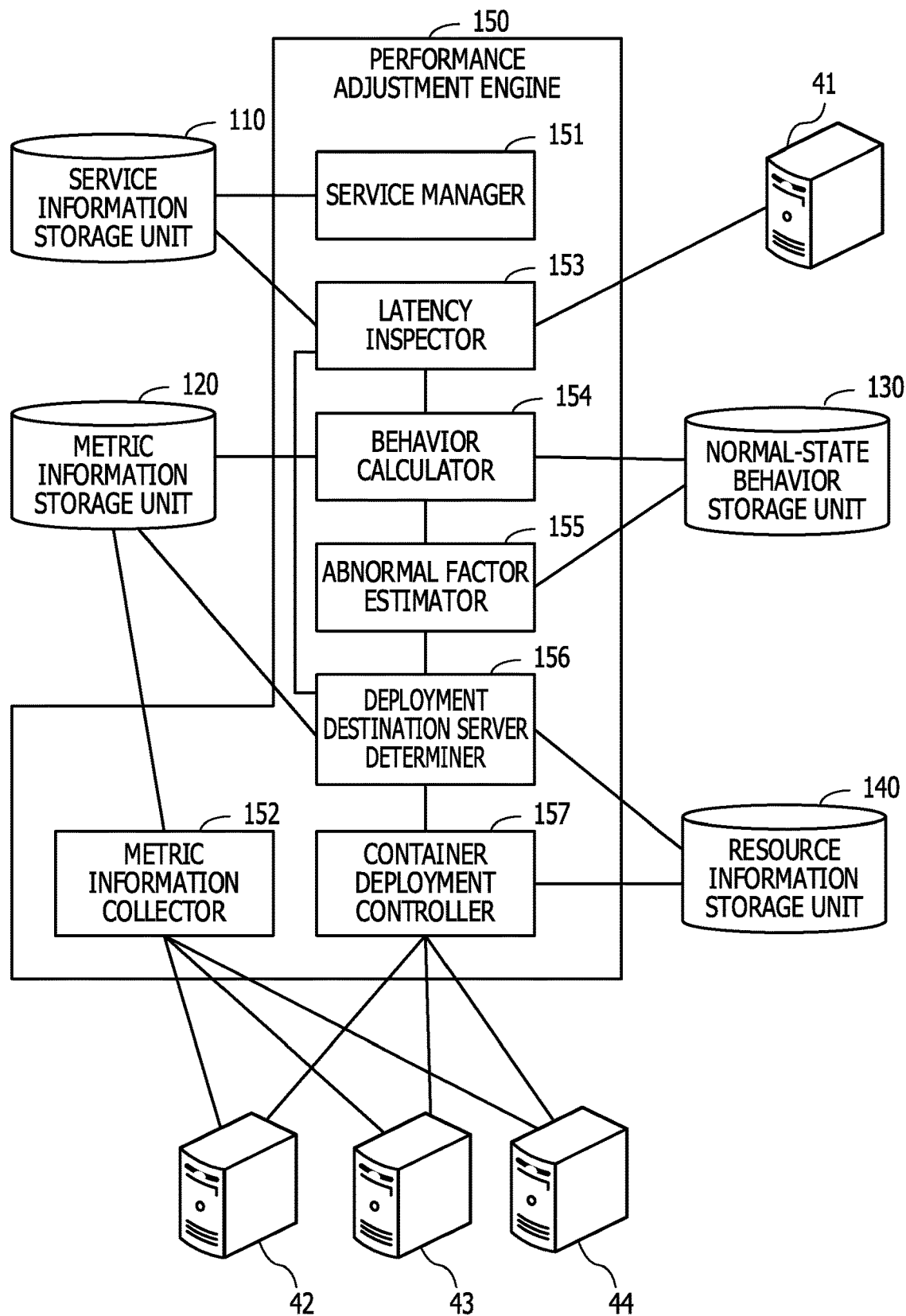
FIG. 11 is a block diagram illustrating functions of a performance adjustment engine.

FIG. 11 is a block diagram illustrating functions of the performance adjustment engine. The performance adjustment engine 150 includes a service manager 151, a metric information collector 152, a latency inspector 153, a behavior calculator 154, an abnormal factor estimator 155, a deployment destination server determiner 156, and a container deployment controller 157.

The service manager 151 manages a configuration of the service and the performance requirement for the service. The metric information collector 152 periodically collects metric values from the servers 42 to 44 and causes the collected metric values to be stored in the metric information storage unit 120. The latency inspector 153 inspects whether or not latency of the service satisfies the performance requirement. The behavior calculator 154 calculates behaviors of containers and behaviors of the servers in the normal state and calculates behaviors of the containers and behaviors of the servers in an abnormal state. The behavior calculator 154 causes the behaviors in the normal state to be stored in the normal-state behavior storage unit 130. The abnormal factor estimator 155 estimates a component (factor component) causing an abnormality of the service of which latency does not satisfy the performance requirement. The deployment destination server determiner 156 determines the number of containers to be added to the factor component and a server in which the determined number of containers to be added are to be deployed. The container deployment controller 157 executes a scale out process on the factor component or changes the deployment of containers for executing the factor component.

Lines that are illustrated in FIG. 11 and connect the elements to each other indicate some of communication paths, and communication paths other than the communication paths illustrated in FIG. 11 may be set. Functions of the elements illustrated in FIG. 11 may be enabled by causing a computer to execute program modules corresponding to the elements.

Next, a process of determining whether or not services satisfy performance requirements is described. The process of determining whether or not the services satisfy the performance requirements is executed by the performance adjustment engine 150.

Figure 12:
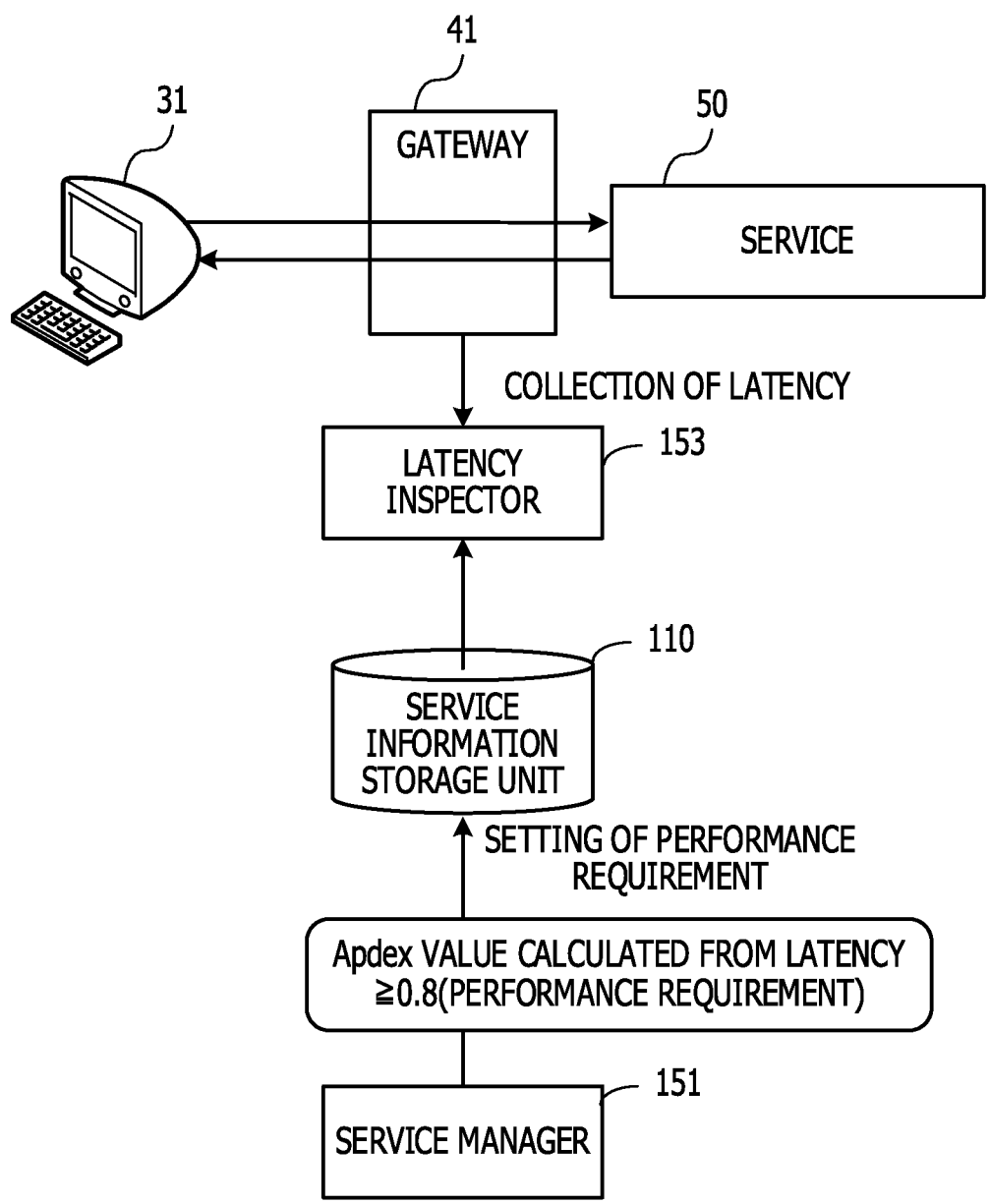
FIG. 12 is a diagram illustrating an example of a process of determining whether or not a performance requirement is satisfied.

FIG. 12 is a diagram illustrating an example of the process of determining whether or not the performance requirements are satisfied. The service manager 151 registers an Apdex value as the performance requirement for the service 50 in the service information storage unit 110 in accordance with an entry by the administrator. For example, the service manager 151 receives the Apdex value entered by the administrator and satisfied time (T) entered by the administrator. Then, the service manager 151 causes the entered Apdex value and the entered satisfied time (T) to be stored in the service management table 111 so that the Apdex value and the satisfied time (T) are associated with the service name of the service 50 in the service management table 111.

The latency inspector 153 periodically collects, from the gateway 41, latency related to a request for the service 50 in the latest predetermined time period. The latency of the service is the difference between the time when the gateway 41 receives the request issued by a terminal device 31 and the time when the gateway 41 transmits a response to the terminal device 31. The latency inspector 153 calculates an Apdex value within the predetermined time period based on the acquired latency. When the calculated Apdex value is equal to or larger than the Apdex value specified as the performance requirement, the latency inspector 153 determines that the service satisfies the performance requirement. When the calculated Apdex value is smaller than the Apdex value specified as the performance requirement, the latency inspector 153 determines that the service does not satisfy the performance requirement.

Then, metric information of the containers and the servers is collected by the metric information collector 152 and stored in the metric information storage unit 120. The collected metric information includes, for example, CPU utilization, input and output (I/O) rates of the memories, the numbers of page faults, I/O rates of disks (file systems), and transmission and reception rates of the network. The behavior calculator 154 calculates, based on the collected metric information, behaviors of the containers and behaviors of the servers within the latest predetermined time period.

Figure 13:
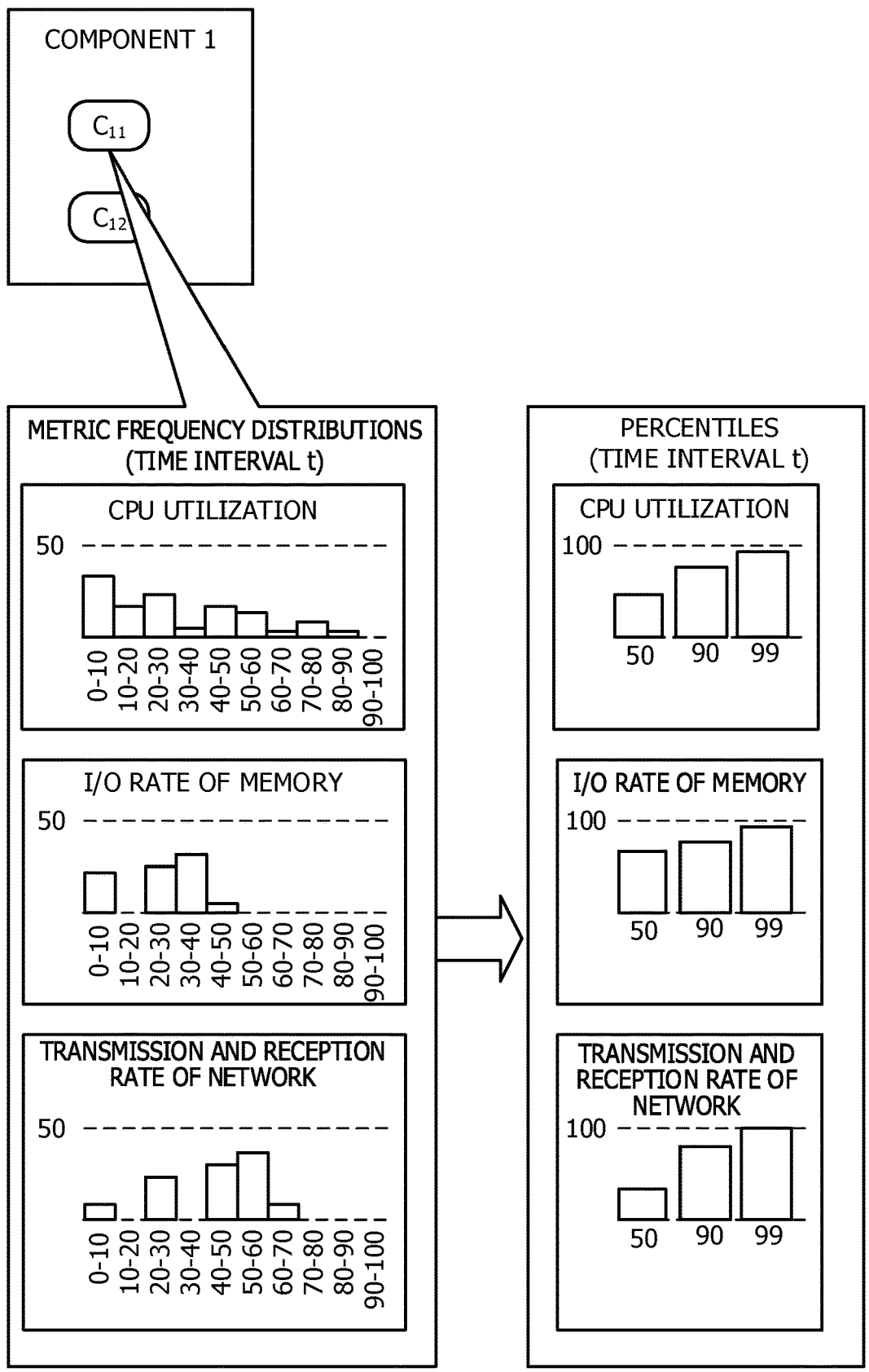
FIG. 13 is a diagram illustrating an example of the calculation of behaviors of containers.

FIG. 13 is a diagram illustrating an example of the calculation of the behaviors of the containers. The example illustrated in FIG. 13 assumes that a behavior of a container $C_{11}$ is calculated. The behavior calculator 154 extracts, from the metric information storage unit 120, records in which container names are "$C_{11}$". Then, the behavior calculator 154 classifies the extracted records based on the metric types. Then, the behavior calculator 154 normalizes values (metric values) set in records in which the same metric type is set so that the values are in a range of 0 to 100, and the behavior calculator 154 generates frequency distributions.

For example, the behavior calculator 154 normalizes the values so that the theoretically maximum value among the metric values is "100". Then, the behavior calculator 154 calculates a 50th percentile value, a 90th percentile value, and a 99th percentile value for each of the metric types based on the frequency distributions.

The behavior calculator 154 calculates behaviors of all containers for executing components for enabling the service 50. When the latency inspector 153 determines that the service 50 satisfies the performance requirement, the behavior calculator 154 generates a container behavior management table 131a for a latest time interval and causes the generated container behavior management table 131a to be stored in the normal-state behavior storage unit 130.

Figure 14:
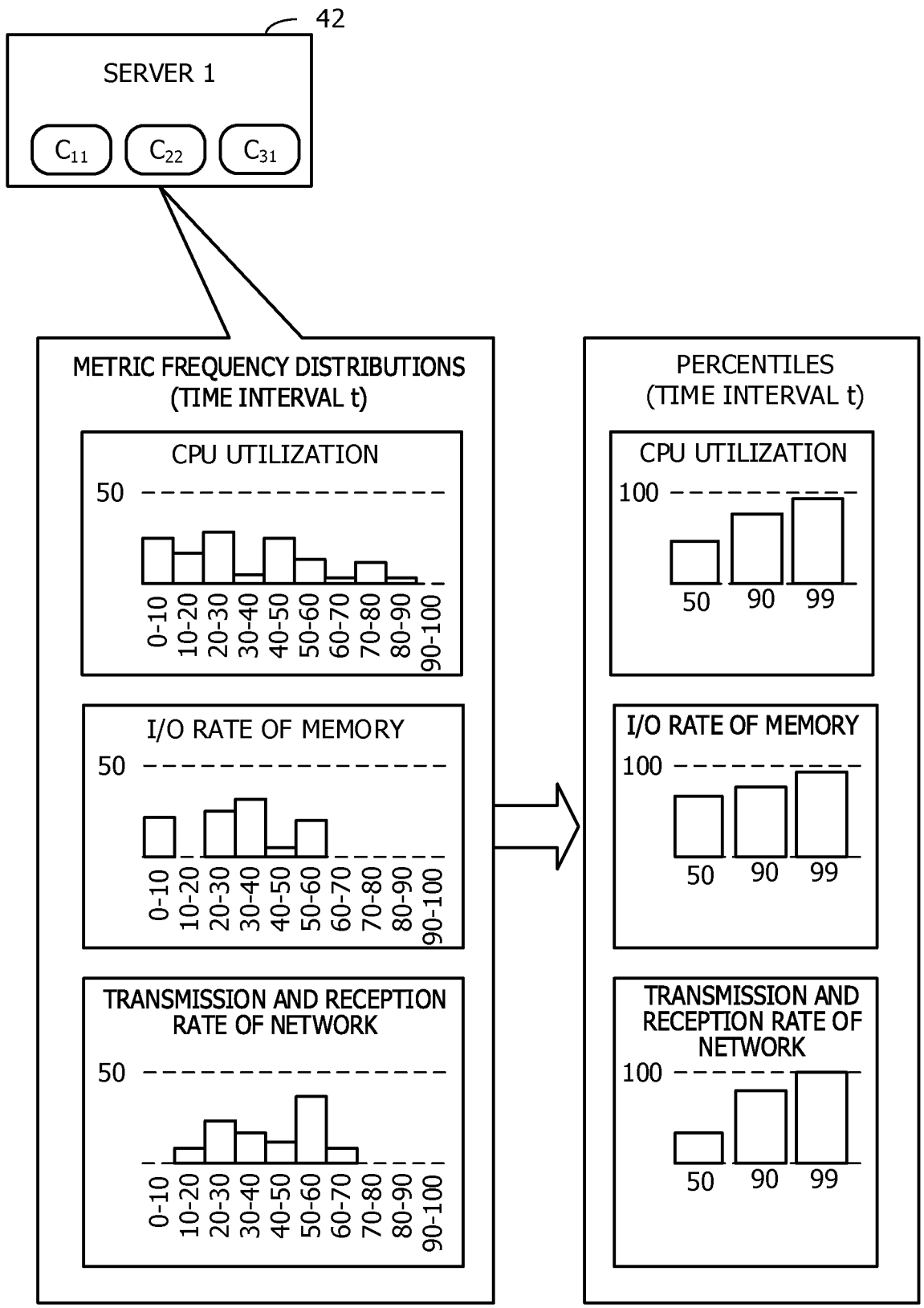
FIG. 14 is a diagram illustrating an example of the calculation of behaviors of servers.

FIG. 14 is a diagram illustrating an example of the calculation of the behaviors of the servers. The example illustrated in FIG. 14 assumes that a behavior of the server 42 having a server name "server 1" is calculated. The behavior calculator 154 extracts, from the metric information storage unit 120, records in which server names are "server 1". Then, the behavior calculator 154 classifies the extracted records based on the metric types. The behavior calculator 154 normalizes values (metric values) set in records in which the same metric type is set so that the values are in a range of 0 to 100, and the behavior calculator 154 generates frequency distributions. Then, the behavior calculator 154 calculates a 50th percentile value, a 90th percentile value, and a 99th percentile value for each of the metric types based on the frequency distributions.

The behavior calculator 154 calculates behaviors of all the servers 42 to 44. When the latency inspector 153 determines that the service 50 satisfies the performance requirement, the behavior calculator 154 generates a server behavior management table 132a for the latest time interval and causes the generated server behavior management table 132a to be stored in the normal-state behavior storage unit 130.

When the latency inspector 153 determines that the service 50 does not satisfy the performance requirement, the behavior calculator 154 transmits, as information indicating behaviors in the abnormal state, the calculated percentile values for the containers and the servers to the abnormal factor estimator 155. Then, the abnormal factor estimator 155 compares the behaviors in the normal state with the behaviors in the abnormal state and estimates a component causing an increase in the latency of the service.

For example, the abnormal factor estimator 155 acquires, from the normal-state behavior storage unit 130, percentile values for metrics of containers for a number n (n is an integer of 1 or more) of latest time intervals. Then, the abnormal factor estimator 155 determines behaviors of the metrics in the normal state based on the acquired percentile values. In this case, the abnormal factor estimator 155 weights the percentile values based on the time intervals in which the percentile values have been acquired, and the abnormal factor estimator 155 treats the behaviors so that as a behavior is acquired in a more recent time interval, the behavior is treated to be closer to a behavior in the future.

Figure 15:
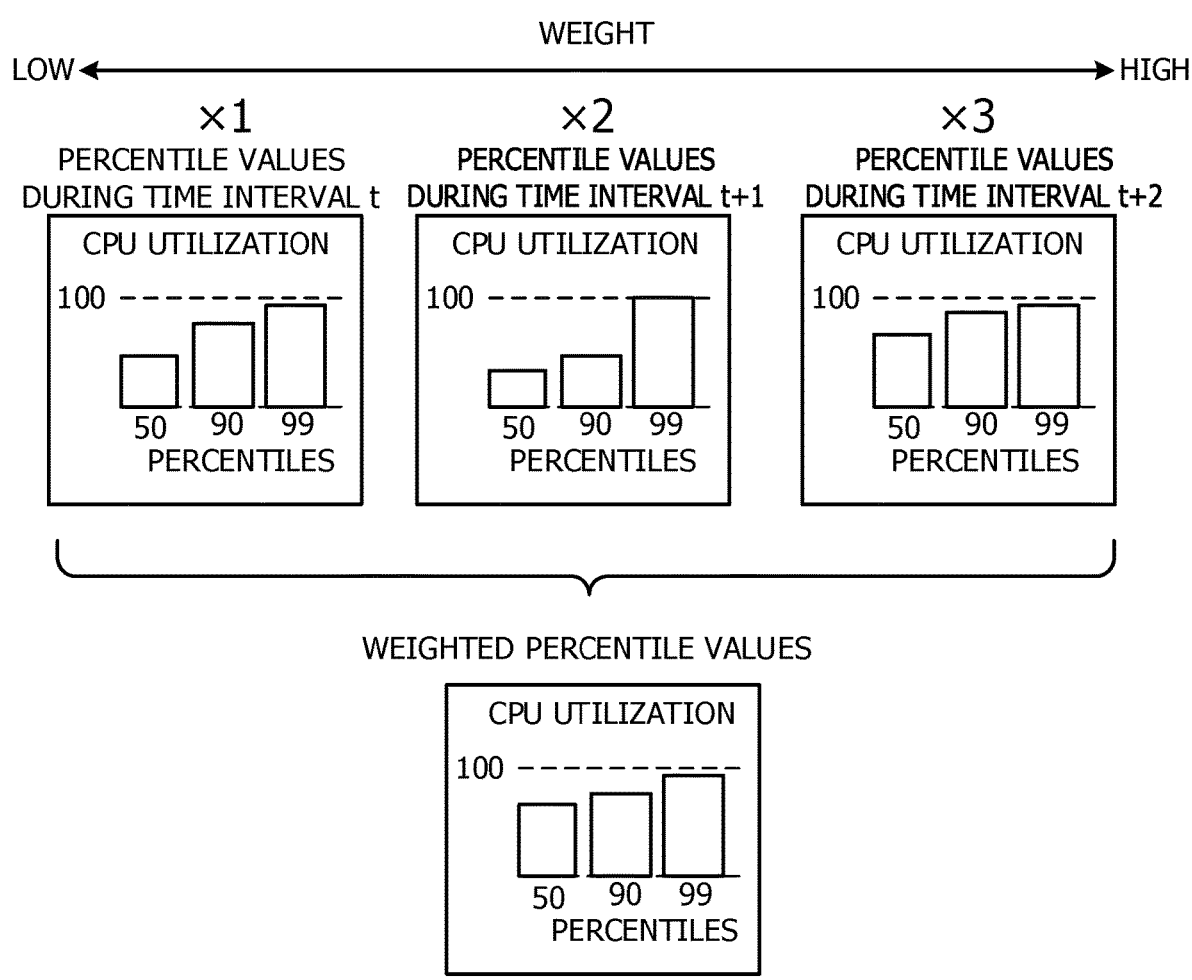
FIG. 15 is a diagram illustrating an example of weighted percentile values.

FIG. 15 is a diagram illustrating an example of the weighted percentile values. The example illustrated in FIG. 15 assumes that percentile values in the normal state in three time intervals t, t+1, and t+2 are acquired. In this case, the abnormal factor estimator 155 sets, to "3", a weight of a percentile value in the latest time interval t+2. The abnormal factor estimator 155 sets, to "2", a weight of a percentile value in the time interval t+1 immediately previous to the time interval t+2. The abnormal factor estimator 155 sets, to "1", a weight of a percentile value in the time interval t immediately previous to the time interval t+1.

In this manner, the abnormal factor estimator 155 calculates percentile values (weighted percentile values) for the metrics within the number n of time intervals so that as a percentile value is acquired in a more recent time interval, a weight for the percentile value is larger. For example, the weighted percentile values are calculated as follows.

It is assumed that the following data items are obtained as percentile values in the normal state. S1 is a set of data items within a latest time interval. S2 is a set of data items within a time interval immediately previous to the latest time interval in which S1 is obtained. S3 is a set of data items within a time interval immediately previous to the time interval in which S2 is obtained. S1={1, 2}, S2={3, 4}, and S3={5, 6}.

In this example, values of the data items are simplified in order to clarify a weighting process. To calculate weighted percentile values for S1, S2, and S3, the numbers of normal data items are increased for weights. For example, weights for the sets S1, S2, S3 are "3", "2", and "1". In this case, the sets S1, S2, and S3 are replaced with the following sets. S1'=S1×3:{1, 1, 1, 2, 2, 2}, S2'=S2×2:{3, 3, 4, 4}, and S3'=S3×1:{5, 6}.

The set S1' is obtained by multiplying the set S1 by 3. The set S1' is obtained by collecting three sets S1. The set S2' is obtained by multiplying the set S2 by 2. The set S2' is obtained by collecting two sets S2. The set S3' is the same as the set S3. The abnormal factor estimator 155 organizes the sets S1', S2', and S'3 into a single set and sorts the data items in ascending order. For example, the abnormal factor estimator 155 generates, for the number of weights, the same sets as the sets for the time intervals, organizes the generated sets into a single set, and sorts the data items in ascending order. As a result of the sorting, the following set S is obtained. S={1, 1, 1, 2, 2, 2, 3, 3, 4, 4, 5, 6}.

The abnormal factor estimator 155 treats percentile values obtained based on the set S as weighted percentile values. Thus, a 50th percentile value is "2", and a 90th percentile value is "4".

The abnormal factor estimator 155 compares a weighted percentile value in the normal state with a latest percentile value indicating a behavior in an abnormal state for each of the metric types and calculates factor degrees related to the metric types. For example, the abnormal factor estimator 155 calculates a positive factor degree and a negative factor degree as the factor degrees.

FIG. 16 is a diagram illustrating an example of the calculation of the factor degrees. In the example illustrated in FIG. 16, as weighted percentile values indicating behaviors in the normal state, a 50th percentile value is "15", a 90th percentile value is "71", and a 99th percentile value is "90". As weighted percentile values indicating behaviors in an abnormal state, a 50th percentile value is "6", a 90th percentile value is "92", and a 99th percentile value is "98".

A positive factor degree and a negative factor degree are defined as follows. The positive factor degree $F_+=\Sigma$ (an increase in p of a p-th percentile whose value increases)×(the difference between percentile values). The negative factor degree $F_-=\Sigma$(an increase in p of a p-th percentile whose value decreases)×(the difference between percentile values).

P is a numerical value indicating a percentile type. When a p-th percentile is a 50th percentile, p=50. The p-th percentile whose value increases is a percentile type indicating that a percentile value of the percentile type in an abnormal state is larger than a percentile value of the percentile type in the normal state. The p-th percentile whose value decreases is a percentile type indicating that a percentile value of the percentile type in the normal state is larger than a percentile value of the percentile type in an abnormal state.

When the percentile types are arranged in ascending order of p value, the increase in p of the p-th percentile indicates an increase in a p value of a target percentile type from a p value of a percentile type that is next smaller than the p value of the target percentile type. In the example illustrated in FIG. 16, there are the 50th percentile, the 90th percentile, and the 99th percentile. In this case, an increase in p of the 50th percentile is "50", an increase in p of the 90th percentile is "40" (90−50), and an increase in p of the 99th percentile is "9" (99−90).

When the latency of the service does not satisfy the performance requirement, and loads of the containers and the servers are higher than those in the normal state, most of metric values are high and positive factor degrees are high. When the latency of the service does not satisfy the performance requirement, and the loads of the containers and the servers are lower than those in the normal state, most of the metric values are low and negative factor degrees are high. When the latency of the service satisfies the performance requirement, and a negative factor degree of a container or server is higher than a positive factor degree of the container or server, it may be determined that the performance decreases due to another factor other than the container or server.

In the example illustrated in FIG. 16, the factor degrees are as follows. The positive factor degree $F_+=(90-50)\times(92-71)+(99-90)\times(98-90)=912$. The negative factor degree $F_-=50\times(15-6)=450$.

The abnormal factor estimator 155 calculates factor degrees for each of the metric types. Then, the abnormal factor estimator 155 estimates, as a factor component causing an abnormality, a component executed by a container from which the maximum factor degree has been calculated.

FIG. 17 is a diagram illustrating an example of the estimation of the factor component. As illustrated in FIG. 17, a positive factor degree and a negative factor degree are calculated for each of the metric types for each of all containers. The abnormal factor estimator 155 extracts the maximum factor degree from the calculated factor degrees. In the example illustrated in FIG. 17, a positive factor degree for CPU utilization of the container $C_{11}$ is the maximum value. The abnormal factor estimator 155 estimates, as the factor component, a component (component name "component 1") executed by the container $C_{11}$ from which the extracted factor degree has been calculated. In this case, the abnormal factor estimator 155 treats the metric type "CPU utilization" corresponding to the maximum factor degree as a factor metric. In addition, the abnormal factor estimator 155 sets, to positive, a container factor degree code indicating whether the maximum factor degree is a positive factor degree or a negative factor degree.

In addition, the abnormal factor estimator 155 acquires, from the container deployment management table 141, the name of a server in which the container from which the maximum factor degree has been calculated is already implemented. Then, the abnormal factor estimator 155 treats the acquired server name as the name of a container executing server. In the example illustrated in FIG. 17, the container executing server is "server 1".

In addition, the abnormal factor estimator 155 calculates factor degrees for each of the metric types of the servers. Then, the abnormal factor estimator 155 compares a positive factor degree with a negative factor degree for each of the metric types of the servers. When a positive factor degree of a metric type is equal to or larger than a negative factor degree of the metric type, the abnormal factor estimator 155 sets a factor degree code of the metric type to "positive". When the positive factor degree of the metric type is smaller than the negative factor degree of the metric type, the abnormal factor estimator 155 sets the factor degree code of the metric type to "negative".

Then, the abnormal factor estimator 155 treats the factor degree code of the factor metric of the container executing server as a server factor degree code.

FIG. 18 is a diagram illustrating an example of the determination of the server factor degree code. In the example illustrated in FIG. 18, since the factor degree code of the factor metric "CPU utilization" of the container executing server "server 1" is "positive", the server factor degree code is "positive".

Factor degrees of the servers may be calculated in the same procedure as that used for the containers. It is, however, sufficient if factor degree codes of the metric types of the servers are clarified. For example, the factor degrees of the metric types of the servers may be calculated according to the following equation without distinguishing positive factor degrees with negative factor degrees. A factor degree F=Σ(an increase in p of a p-th percentile)×(the difference between percentile values).

In this case, the difference between the percentile values is a value obtained by subtracting a percentile value in an abnormal state from a percentile value in the normal state. When the factor degree F calculated in the aforementioned manner is equal to or larger than 0, a factor degree code is "positive". When the factor degree F calculated in the aforementioned manner is negative, the factor degree code is "negative".

When a container factor degree code determined by the abnormal factor estimator 155 is positive, the deployment destination server determiner 156 determines that the amount of a resource assigned to a factor component is insufficient, and the deployment destination server determiner 156 determines the number of containers to be added to the factor component. In addition, the deployment destination server determiner 156 determines a server in which the determined number of containers to be added are to be deployed.

Figure 19:
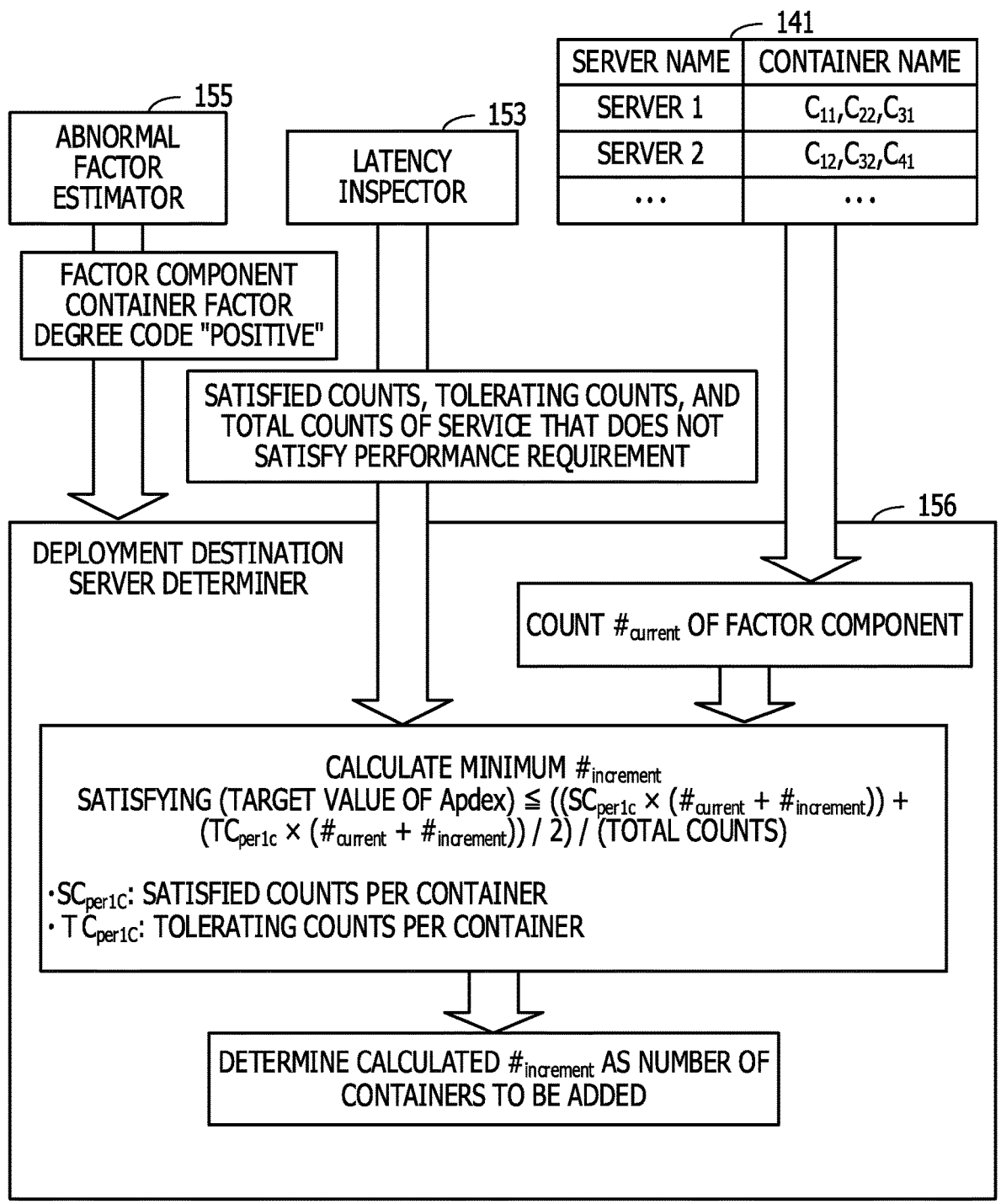
FIG. 19 is a diagram illustrating an example of a process of determining the number of containers to be added.

FIG. 19 is a diagram illustrating an example of a process of determining the number of containers to be added. When the amount of a resource assigned to a factor component is insufficient, the deployment destination server determiner 156 determines the number of containers to be added, based on statistical values based on measured latency and the number of current containers.

For example, the deployment destination server determiner 156 acquires, from the abnormal factor estimator 155, a result of estimating an abnormal factor. When a container factor degree code indicated in the estimation result is "positive", the deployment destination server determiner 156 determines the number of containers to be added to the factor component. In this case, the deployment destination server determiner 156 acquires, from the latency inspector 153, statistical values based on latency of a service (not satisfying a performance requirement) including the factor component. The statistical values based on the latency are "satisfied counts", "tolerating counts", and "total counts". The statistical values are used by the latency inspector 153 to calculate an Apdex value.

The deployment destination server determiner 156 references the container deployment management table 141 and counts the number of containers of the factor component. The deployment destination server determiner 156 treats the counted number of containers as $\#_{current}$.

The deployment destination server determiner 156 calculates, based on the acquired statistical values and $\#_{current}$, the minimum number of containers to be added so that the minimum number of containers to be added satisfies a target value of Apdex. For example, the deployment destination server determiner 156 calculates "satisfied counts" ($SC_{per1c}$) container and "tolerating counts" ($TC_{per1c}$) per container. "$SC_{per1c}$" and "$TC_{per1c}$" correspond to contributions of a single container to Apdex.

"$SC_{per1c}$" and "$TC_{per1c}$" are calculated according to the following equations. $SC_{per1c}$=(measured satisfied counts)/$\#_{current}$. $TC_{per1c}$=(measured tolerating counts)/$\#_{current}$.

The deployment destination server determiner 156 calculates the minimum $\#_{increment}$ satisfying the following inequality. The target value of Apdex $\leq((SC_{per1c}\times(\#_{current}+\#_{increment}))+(TC_{per1c}\times(\#_{current}\#_{increment}))/2)/$(total counts).

The calculated $\#_{increment}$ is the number of containers to be added. After the number of containers to be added is determined, the deployment destination server determiner 156 determines a deployment destination server in which the determined number of containers to be added are to be deployed. In this case, the deployment destination server determiner 156 determines the deployment destination server based on a capacity included in the deployment destination server and to be used to additionally deploy the containers so that an excess resource amount of the deployment destination server is as large as possible.

To accurately calculate the excess resource amount of the server after the deployment of the containers, the deployment destination server determiner 156 calculates an increase in a metric value per container.

Figure 20:
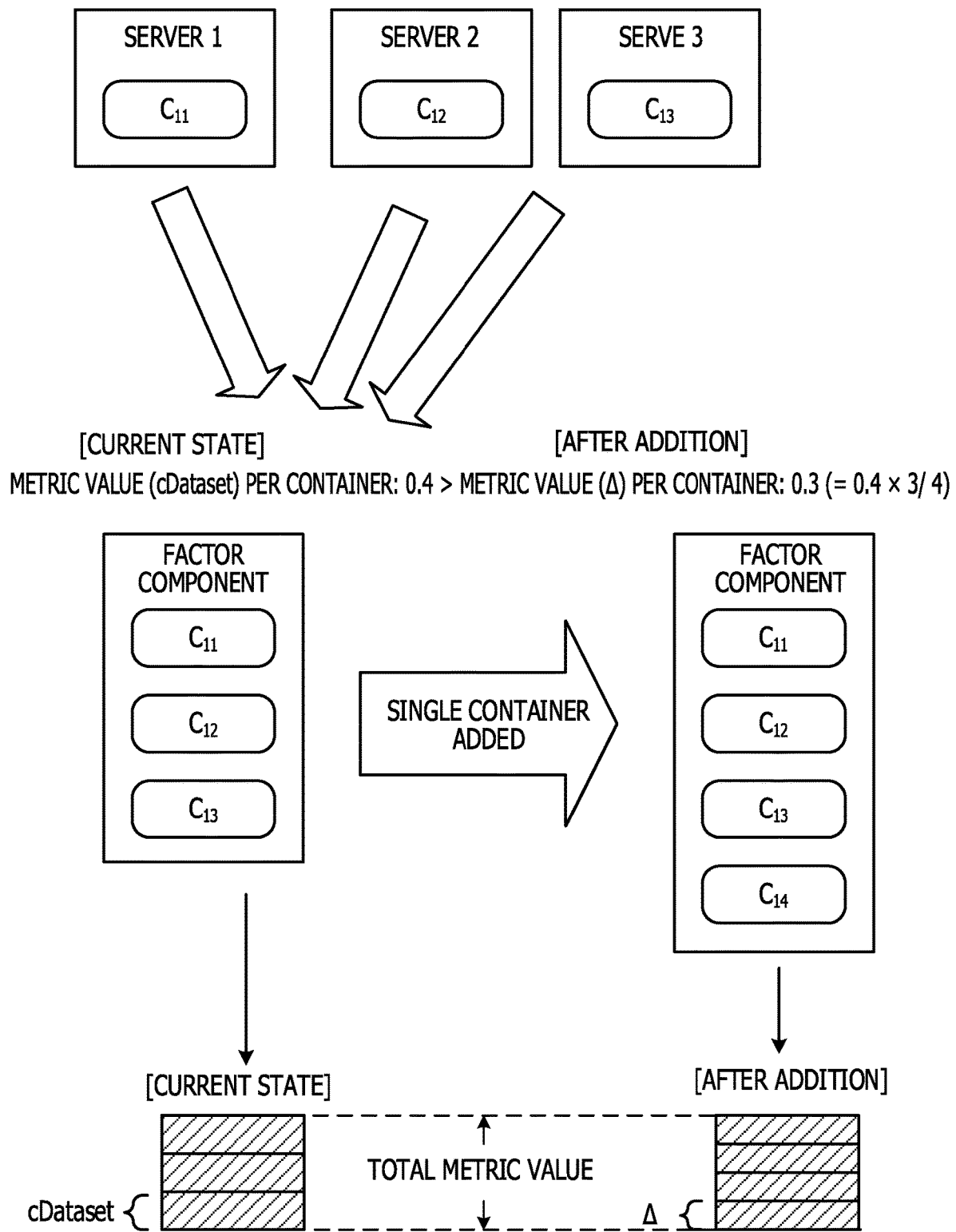
FIG. 20 is a diagram illustrating an example of the calculation of an increase in a metric value per container.

FIG. 20 is a diagram illustrating an example of the calculation of the increase in the metric value per container. In the example illustrated in FIG. 20, containers of a factor component are deployed in three servers, respectively. The average of metric values of the containers is a metric value (cDataset) per current container for the metric type. In the example illustrated in FIG. 20, the metric value per current container is "0.4".

An example in which a single container of the factor component is added is considered. Even when the number of containers is increased, a total metric value per container does not change, and a process to be executed in a distributed manner by the three containers is changed to a process to be executed in a distributed manner by the four containers. Thus, a metric value (Δ) per container after the addition is smaller than the metric value per container before the addition. The metric value (Δ) per container after the addition of the container is calculated by calculating "a current metric value per container×the number of containers before the addition/the number of containers after the addition". In the example illustrated in FIG. 20, the metric value (Δ) per container after the addition of the container is "0.3" (0.4× 3/4).

Although the example illustrated in FIG. 20 indicates the case where the single container is added, the number of containers to be added may be 2 or more. In this case, the metric value (Δ) per container after the addition of the containers further decreases.

In the determination of a deployment destination server in which a container is to be deployed, the deployment destination server determiner 156 determines an excess resource amount of the deployment destination server after the addition of the container, based on a metric value (Δ) per container after the addition of the container. The deployment destination server determiner 156 may determine the excess resource amount of the server by subtracting the total of metric values of containers deployed in the server from the maximum metric value ("1" after normalization) for a specific resource of the server. When the metric value is normalized to 1 or less, the deployment destination server determiner 156 may compare totals of metric values of containers deployed in multiple servers with each other, thereby identifying a server that will have the maximum excess resource amount after the addition of the container.

Figure 21:
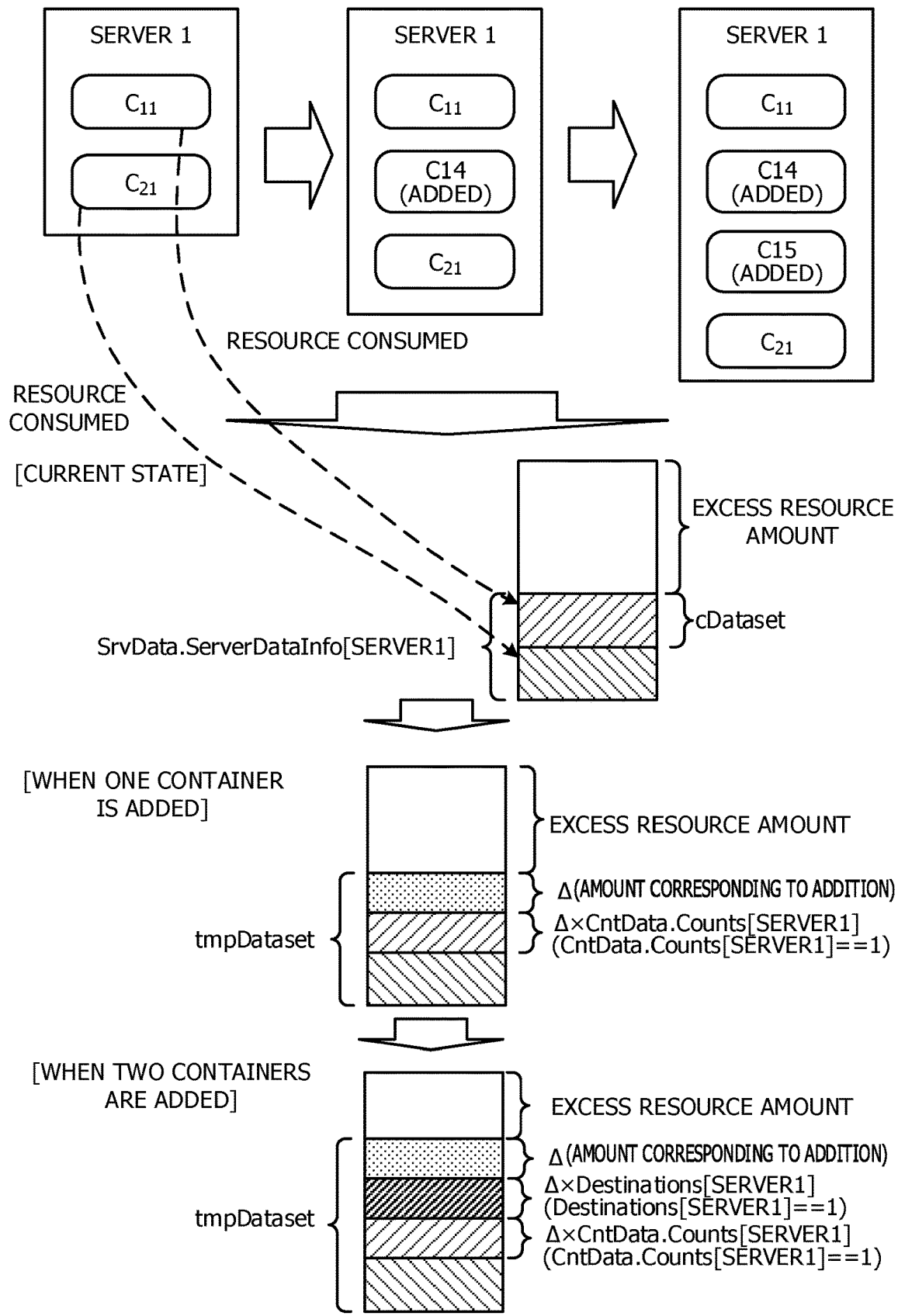
FIG. 21 is a diagram illustrating relationships between the total of metric values of containers deployed in a server and an excess resource amount of the server.

FIG. 21 is a diagram illustrating relationships between the total of metric values of containers deployed in a server and an excess resource amount of the server. In the example illustrated in FIG. 21, a container $C_{11}$ of a component with a component number "1" and a container $C_{21}$ of a component with a component number "2" are deployed in a "server 1". It is assumed that when the component with the component number "1" is a factor component, a container of the factor component is added to the "server 1".

In a current state, a resource of the "server 1" is consumed by the container $C_{11}$ and the container $C_{21}$. A metric value indicating a currently consumed resource amount is the total of metric values of the container $C_{11}$ and $C_{21}$. The metric value indicating the currently consumed resource amount is indicated by "SrvData.ServerDataInfo[Server 1]". The metric value of the container $C_{11}$ is "cDataset". A value obtained by subtracting "SrvData.ServerDataInfo[Server 1]" from the maximum metric value of the "server 1" is a current excess resource amount of the "server 1". A resource amount consumed by the container $C_{21}$ is expressed by "SrvData.ServerDataInfo[Server 1]–cDataset".

The deployment destination server determiner 156 calculates an excess resource amount of the "server 1" in the case where a single container of the factor component is added to the "server 1". In this case, a resource amount consumed by the container $C_{21}$ of a component different from the factor component does not change. The resource amount consumed by the container $C_{11}$ of the factor component is expressed by a metric value (Δ) per container after the addition of the container. The number ("1" in the example illustrated in FIG. 21) of containers of the factor component deployed in the "server 1" is "CntData.Counts[Server 1]". In this case, a total resource amount consumed by deployed containers of the factor component may be calculated to be "ΔxCntData.Counts[Server 1]". The deployment destination server 156 adds, to the resource amount consumed by the container $C_{21}$, "ΔxCntData.Counts[Server 1]" and "Δ" indicating a resource amount to be consumed by the container to be added. The result of the addition is a metric value "tmpDataset" indicating a resource amount to be consumed when the single container is added to the "server 1".

The deployment destination server determiner 156 calculates "tmpDataset" for servers other than the "server 1" and determines, as a server in which the container is to be deployed, a server for which the minimum "tmpDataset" is calculated. It is assumed that the deployment destination server determiner 156 determines that a single container of the factor component is added to the "server 1". When the number of containers determined to be added to the "server 1" is "Destinations [Server 1]", a resource amount to be consumed by the containers determined to be added is "ΔxDestinations [Server 1]".

The excess resource amount of the "server 1" when the containers are added to the "server 1" (the two containers are actually added to the "server 1") is calculated based on "ΔxDestinations [Server 1]". For example, the deployment destination server determiner 156 adds, to a resource amount consumed by the container $C_{21}$, "ΔxCntData.Counts[Server 1]", "ΔxDestinations[Server 1]", and "Δ" indicating a resource amount to be consumed by the containers to be added. The result of the addition is a metric value "tmpDataset" indicating a resource amount to be consumed when the two containers are added to the "server 1".

The value of "tmpDataset" of the server in which the containers are determined to be deployed increases. Thus, even when "tmpDataset" of the server when the first single container is determined to be deployed is the minimum value, "tmpDataset" of the server when the second single container is determined to be deployed may not be the minimum value.

Figure 22:
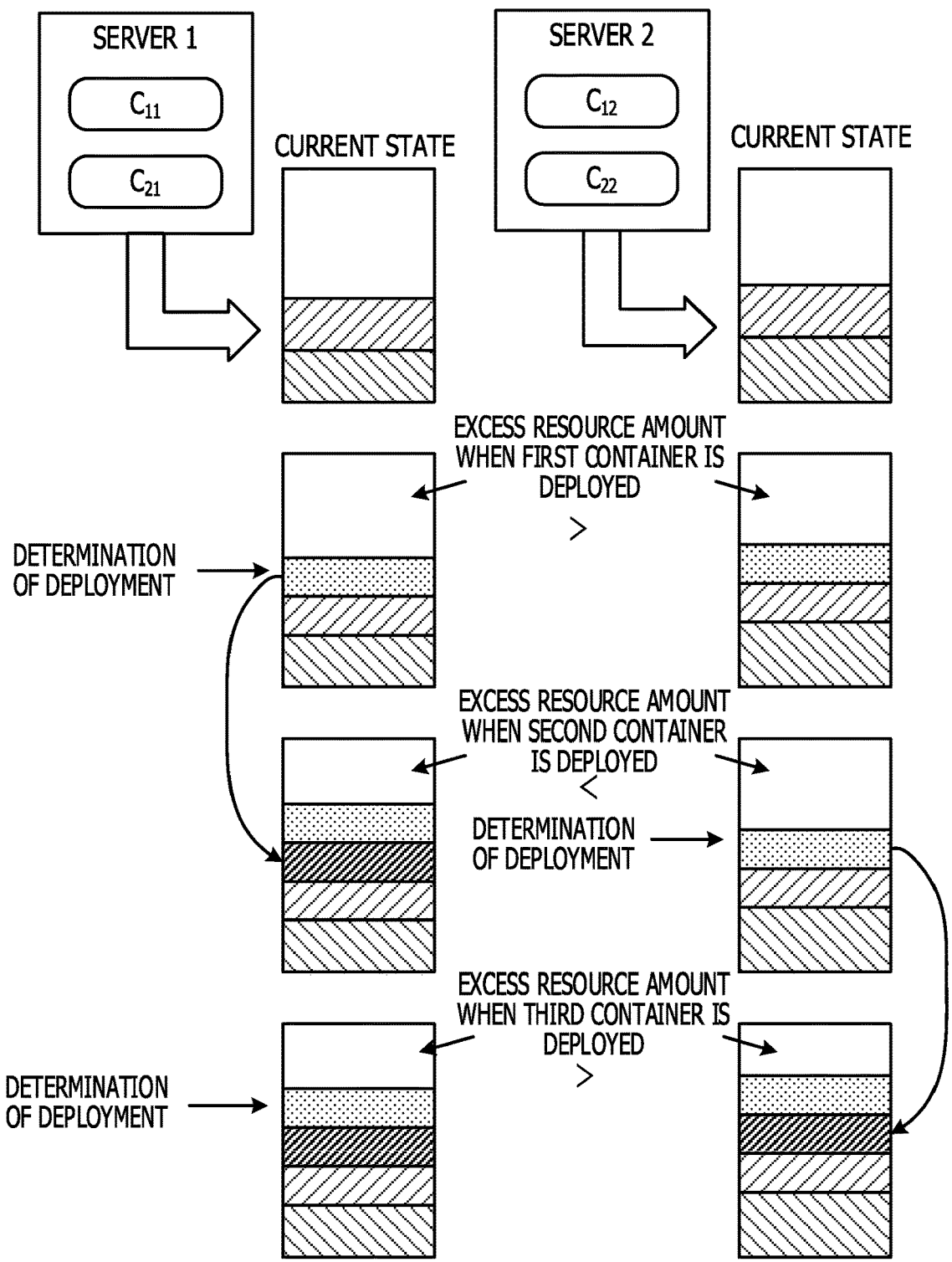
FIG. 22 is a diagram illustrating an example of the determination of a deployment destination server in which one or more containers are to be deployed.

FIG. 22 is a diagram illustrating an example of the determination of a deployment destination server in which one or more containers are to be deployed. The example illustrated in FIG. 22 indicates the case where servers to which three containers of the component with the component number "1" are added are selected from among a "server 1" and a "server 2".

In a current state, an excess resource amount of the "server 1" is larger than that of the "server 2" (or "tmpDataset" of the "server 1" is smaller than "tmpDataset" of the "server 2"). Thus, the deployment determination server determiner 156 determines the "server 1" as a deployment destination server in which a first single container is to be deployed. The excess resource amount of the "server 1" is reduced due to the deployment of the single container, and the excess resource amount of the "server 2" is larger than that of the "server 1". Thus, the deployment determination server determiner 156 determines the "server 2" as a deployment destination server in which a second single container is to be deployed. The excess resource amount of the "server 2" is reduced due to the deployment of the single container, and the excess resource amount of the "server 1" is larger than that of the "server 2". Thus, the deployment determination server determiner 156 determines the "server 1" as a deployment destination server in which a third single container is to be deployed.

When the container factor degree code is positive, the deployment determination server determiner 156 determines that the amount of a resource assigned to the factor component is insufficient, and the deployment determination server determiner 156 determines the number of containers to be added and a deployment destination server in which the determined number of containers to be added are to be deployed. Then, the container deployment controller 157 executes the scale out process on the factor component based on the determined destination server in which the determined number of containers are to be deployed. When the factor degree of the factor component is negative and the server factor degree code is "positive", the container deployment controller 157 determines that performance of the factor component decreases due to a high load of a resource assigned to a component other than the factor component. In this case, the container deployment controller 157 changes the deployment of containers. The change in the deployment of the containers is a process of changing a server for executing the containers to another server so that the other server executes the containers.

When the amount of a resource assigned to the factor component is insufficient, the Apdex value of the service is increased to a value larger than the target value of Apdex by executing the scale out process to add the determined number of containers to the factor component.

Figure 23:
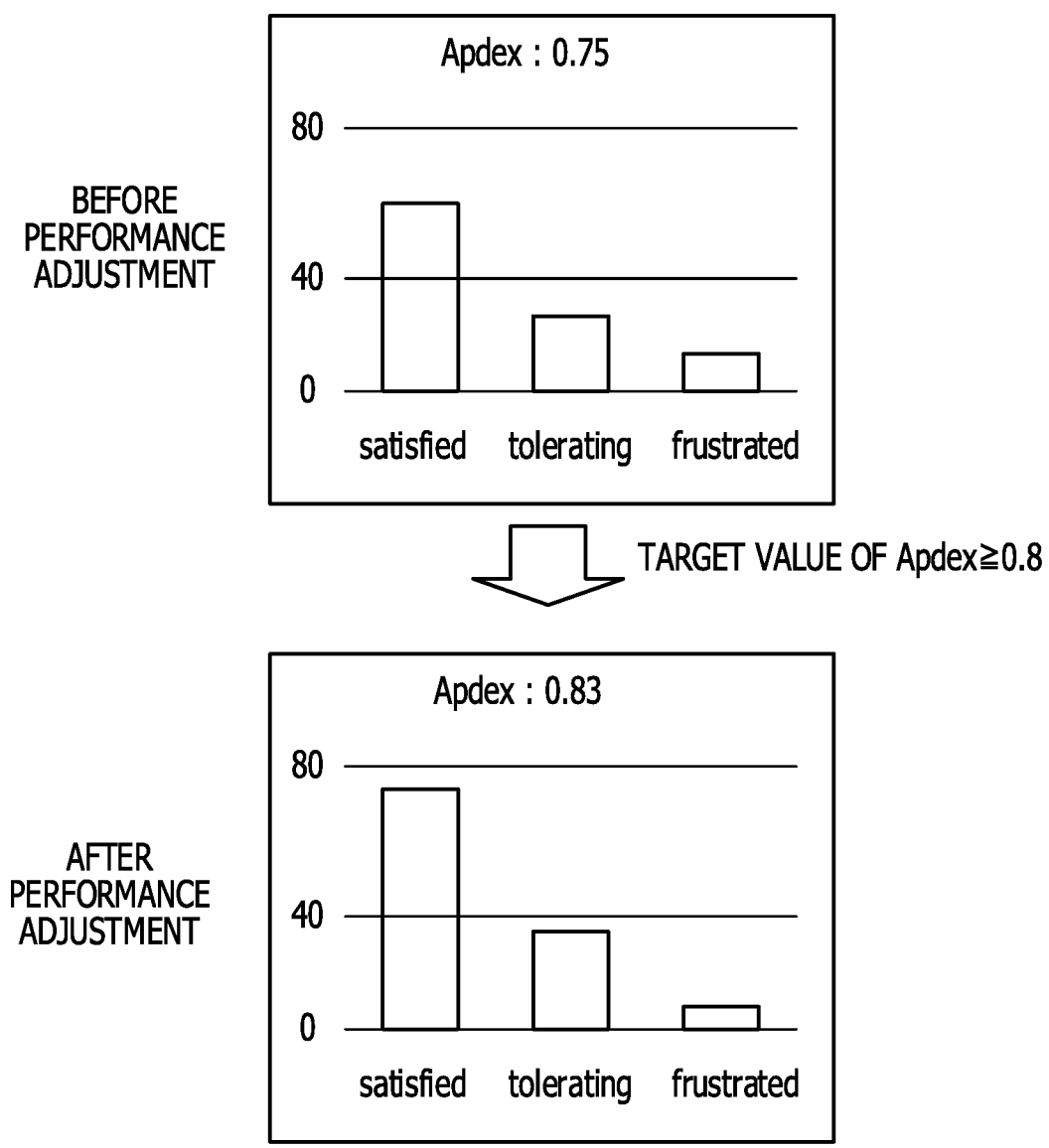
FIG. 23 is a diagram illustrating an example of results of performance adjustment.

FIG. 23 is a diagram illustrating an example of results of the performance adjustment. In the example illustrated in FIG. 23, the target value of Apdex is equal to or larger than 0.8. The Apdex value is "0.75" before the performance adjustment and is increased to "0.83 by the performance adjustment.

When the scale out process is executed to add a large number of containers at once, a process load of the entire system may temporarily become excessive. Thus, the deployment destination server determiner 156 sets an upper limit on the number of containers to be added at once in the scale out process. When a calculated number of containers to be added exceeds the upper limit, the deployment destination server determiner 156 sets, to the upper limit, the number of containers to be added. Then, the deployment destination server determiner 156 and the container deployment controller 157 coordinate with each other to deploy containers in a server so that the number of deployed containers is equal to the upper limit, and repeatedly execute the scale out process on the factor component until the Apdex value becomes equal to or larger than the target value.

Next, a procedure for the performance adjustment process is described.

Figure 24:
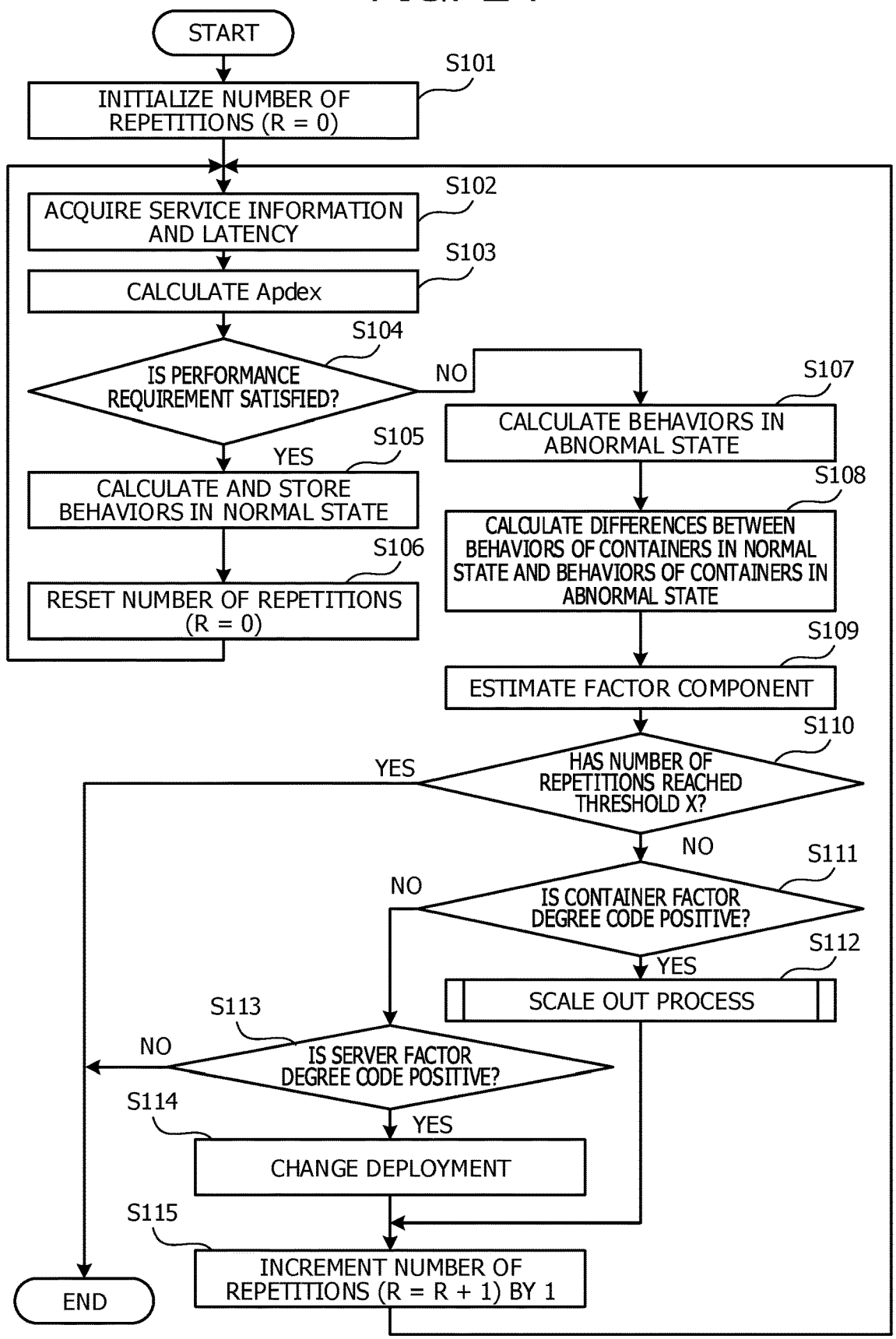
FIG. 24 is a flowchart of an example of a procedure for a performance adjustment process.

FIG. 24 is a flowchart of an example of the procedure for the performance adjustment process. The process illustrated in FIG. 24 is executed to adjust performance of a single service. In the case where performance of multiple services is adjusted, the process illustrated in FIG. 24 is executed on each of the multiple services. The process illustrated in FIG. 24 is described below using steps.

In step S101, the performance adjustment engine 150 initializes the value of a variable R indicating the number of repetitions to "0" when the administrator or the like enters an instruction to start the process of adjusting the performance of the service.

In step S102, the latency inspector 153 acquires service information on the service and latency of the service of which the performance is to be adjusted. For example, the latency inspector 153 acquires the service information from the service information storage unit 110. The acquired service information includes an Apdex value specified as a performance requirement and satisfied time (T) to be used to calculate Apdex. In addition, the latency inspector 153 acquires latency, measured within the latest predetermined time period, for requests for the service of which the performance is to be adjusted from the latency storage unit 41b of the gateway 41.

In step S103, the latency inspector 153 calculates an Apdex value of the service based on the latency for the multiple requests.

In step S104, the latency inspector 153 determines whether or not the Apdex value calculated in step S103 satisfies the performance requirement. For example, when the calculated Apdex value is equal to or larger than the Apdex value specified as the performance requirement, the latency inspector 153 determines that the Apdex value calculated in step S103 satisfies the performance requirement. When the Apdex value calculated in step S103 satisfies the performance requirement, the latency inspector 153 causes the process to proceed to step S105. When the Apdex value calculated in step S103 does not satisfy the performance requirement, the latency inspector 153 causes the process to proceed to step S107.

In step S105, the behavior calculator 154 calculates behaviors of containers and behaviors of the servers in the normal state and causes the calculated behaviors to be stored in the normal-state behavior storage unit 130. For example, the behavior calculator 154 acquires, from the metric information storage unit 120, metric values of the containers and the servers for the latest predetermined time period and calculates percentile values of multiple percentile types. Then, the behavior calculator 154 causes a container behavior management table including the set percentile values of the containers to be stored as information indicating the behaviors of the containers in the normal state in the normal-state behavior storage unit 130. In addition, the behavior calculator 154 causes a server behavior management table including the set percentile values of the servers to be stored as information indicating the behaviors of the servers in the normal state in the normal-state behavior storage unit 130.

In step S106, the performance adjustment engine 150 resets the variable R indicating the number of repetitions to "0". After that, the performance adjustment engine 150 causes the process to proceed to S102.

In step S107, the behavior calculator 154 calculates behaviors of the containers and behavior of the servers in an abnormal state. For example, the behavior calculator 154 acquires, from the metric information storage unit 120, metric values of the containers and the servers for the latest predetermined time period and calculates percentile values of multiple percentile types for the containers and the servers. The percentile values calculated for the multiple containers are information indicating behaviors of the containers in the abnormal state. The percentile values calculated for the multiple servers are information indicating the behaviors of the server in the abnormal state.

In step S108, the abnormal factor estimator 155 calculates, for each of the metric types, differences between behaviors of containers for executing components to be used to provide the service of which the performance is to be adjusted in the normal state and behaviors of the containers for executing the components in the abnormal state. For example, the abnormal factor estimator 155 acquires weighted percentile values from the normal-state behavior storage unit 130. Then, the abnormal factor estimator 155 compares weighted percentile values indicating the behaviors in the normal state with weighted percentile values indicating the behaviors calculated in step S107 in the abnormal state and calculates positive factor degrees and negative factor degrees for the metric types.

In step S109, the abnormal factor estimator 155 estimates a factor component based on the results of the calculation of step S108. For example, the abnormal factor estimator 155 extracts the largest factor degree among the positive and negative factor degrees calculated for the metric types. Then, the abnormal factor estimator 155 estimates, as the factor component, a component executed by a container from which the extracted factor degree has been calculated.

In step S110, the performance adjustment engine 150 determines whether or not the value of the variable R indicating the number of repetitions has reached a threshold X (X is an integer of 1 or more). When the number of repetitions has reached the threshold X, the performance adjustment engine 150 does not execute the performance adjustment and terminates the process. When the number of repetitions has not reached the threshold X, the container deployment controller 157 causes the process to proceed to step S111.

In step S111, the container deployment controller 157 determines whether or not a code (container factor degree code) of the factor degree extracted in step S109 is positive. When the container factor degree code is positive, the container deployment controller 157 causes the process to proceed to step S112. When container factor degree code is negative, the container deployment controller 157 causes the process to proceed to step S113.

In step S112, the deployment destination server determiner 156 and the container deployment controller 157 coordinate with each other to execute the scale out process on the factor component. In this case, the deployment destination server determiner 156 determines the number of containers to be added to the factor component and a server in which the determined number of containers to be added are to be deployed. Then, the container deployment controller 157 additionally deploys the containers for executing the factor component in the determined server. The scale out process is described later in detail (refer to FIG. 25). After that, the container deployment controller 157 causes the process to proceed to step S115.

In step S113, the container deployment controller 157 determines whether or not the server factor degree code is positive. When the server factor degree code is positive, the container deployment controller 157 causes the process to proceed to step S114. When the server factor degree code is negative, the container deployment controller 157 does not execute the performance adjustment and terminates the process.

In step S114, the container deployment controller 157 changes the deployment of containers. In this case, the container deployment controller 157 changes, from a current server to another server, a deployment destination server in which the container from which the factor degree extracted in step S109 has been calculated is to be deployed.

In step S115, the performance adjustment engine 150 increments, by 1, the value of the variable R indicating the number of repetitions and causes the process to proceed to step S102.

By executing the scale out process or changing the deployment, processing power of the component is adjusted so that the service satisfies the performance requirement.

Next, the scale out process is described.

Figure 25:
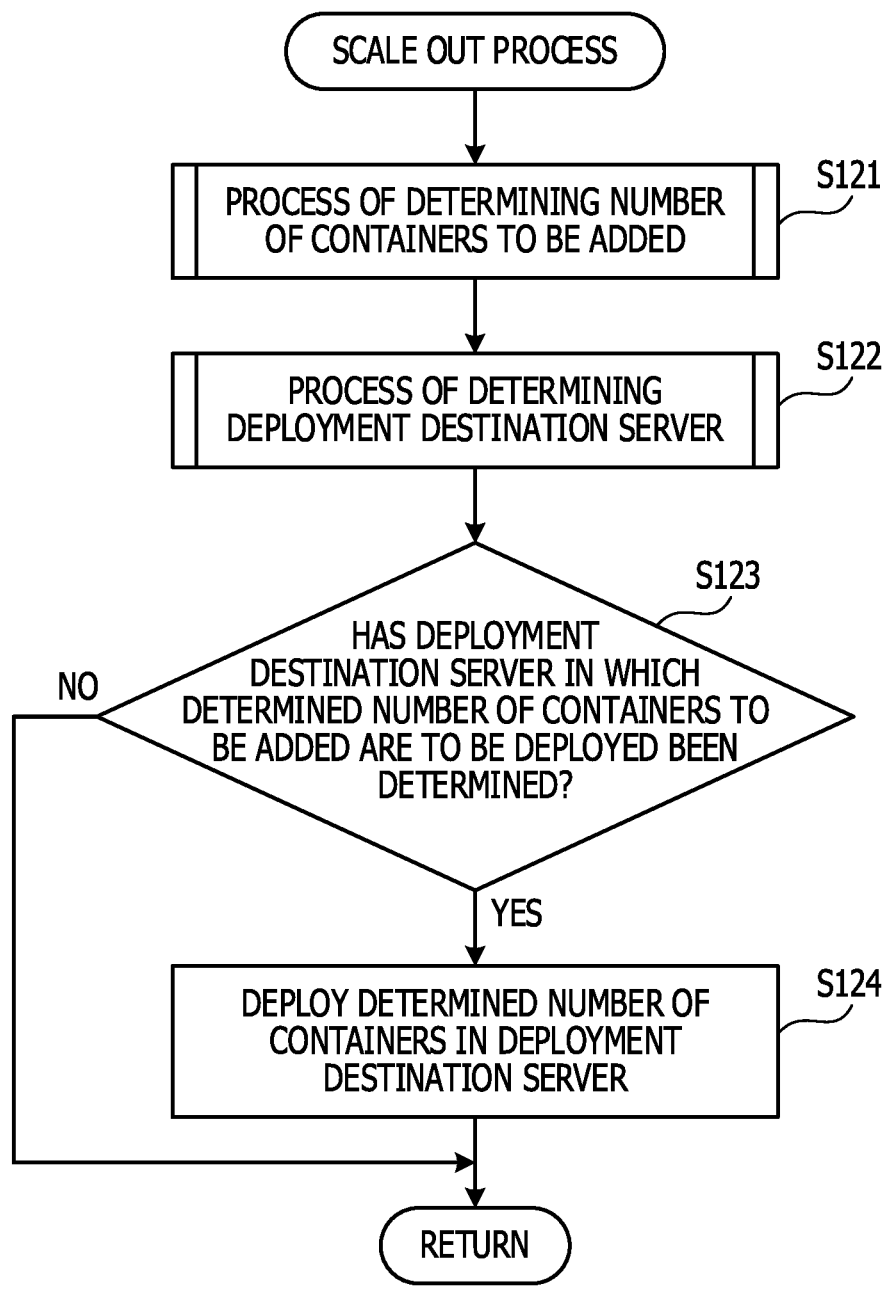
FIG. 25 is a flowchart of an example of a procedure for a scale out process.

FIG. 25 is a flowchart of an example of a procedure for the scale out process. The process illustrated in FIG. 25 is described below using steps.

In step S121, the deployment destination server determiner 156 executes a process of determining the number of containers to be added. The number of containers to be added to the factor component is determined by the process of determining the number of containers to be added. The process of determining the number of containers to be added is described later in detail (refer to FIG. 26).

In step S122, the deployment destination server determiner 156 executes a process of determining a deployment destination server. A server in which the determined number of containers to be added are to be deployed is determined. The process of determining a deployment destination server is described later in detail (refer to FIG. 27).

In step S123, the deployment destination server determiner 156 determines whether or not the server in which the determined number of containers to be added are to be deployed has been determined. When the server in which the determined number of containers to be added are to be deployed has been determined, the deployment destination server determiner 156 causes the process to proceed to step S124. When the server in which the determined number of containers to be added are to be deployed has not been determined, the deployment destination server determiner 156 determines whether the container deployment is possible and the deployment destination server determiner 156 terminates the process.

In step S124, the container deployment controller 157 additionally deploys the determined number of containers of the factor component in the determined deployment destination server.

In this manner, an appropriate number of containers may be deployed at once.

Next, a procedure for the process of determining the number of containers to be added is described in detail.

Figure 26:
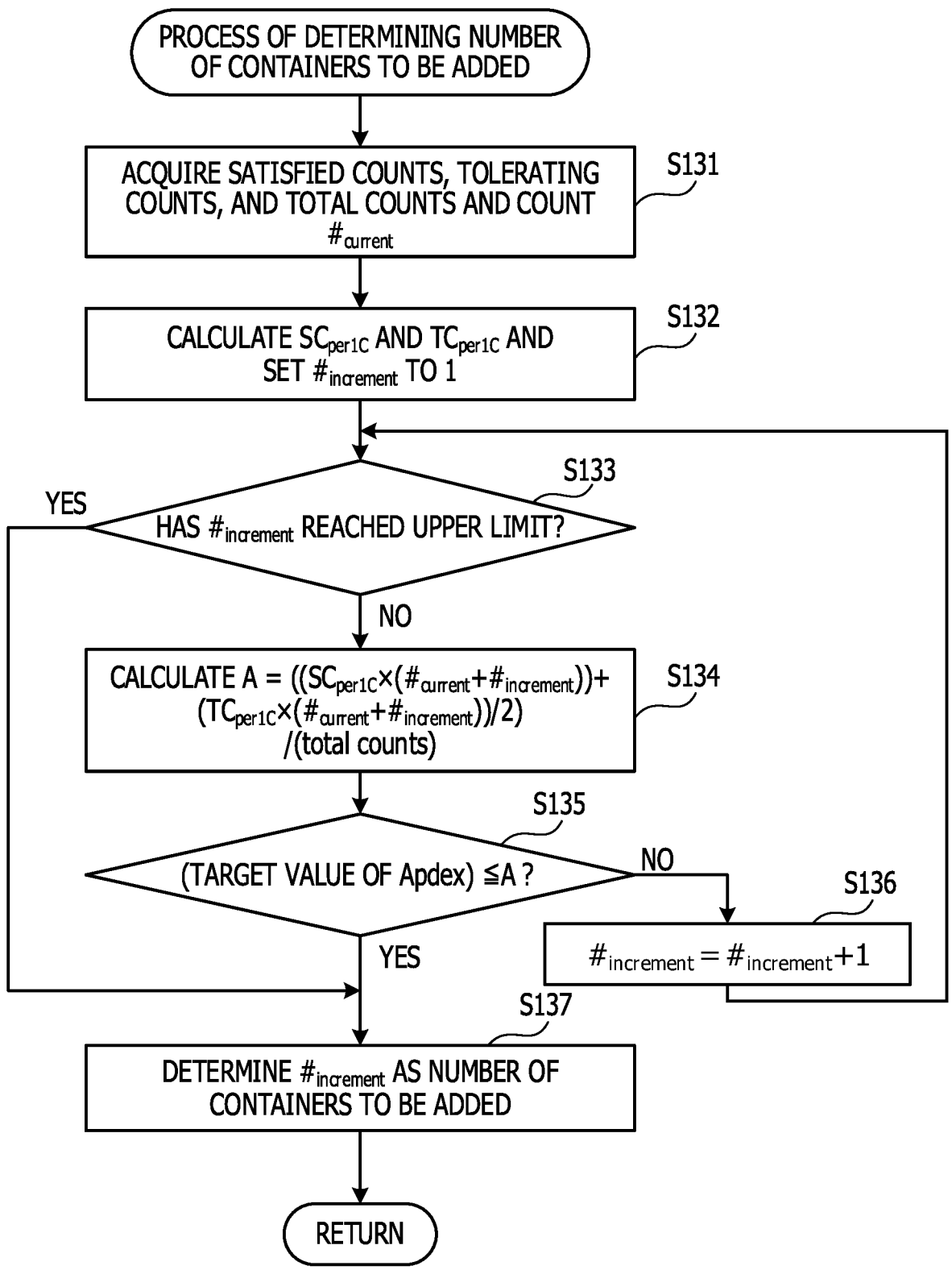
FIG. 26 is a flowchart of an example of a procedure for a process of determining the number of containers to be added.

FIG. 26 is a flowchart of an example of the procedure for the process of determining the number of containers to be added. The process illustrated in FIG. 26 is described below using steps.

In step S131, the deployment destination server determiner 156 acquires, from the latency inspector 153, "satisfied counts", "tolerating counts", and "total counts" of the service that does not satisfy the performance requirement. The deployment destination determiner 156 counts the number ($\#_{current}$) of current containers of the factor component based on the container deployment management table 141.

In step S132, the deployment destination server determiner 156 calculates "satisfied counts" ($SC_{per1c}$) per container and "tolerating counts" ($TC_{per1c}$) per container. In addition, the deployment destination server determiner 156 sets "$\#_{increment}$" to an initial value "1".

In step S133, the deployment destination server determiner 156 determines whether or not $\#_{increment}$ has reached a predetermined upper limit.

The upper limit is a value set by the administrator based on processing power of the entire system. When $\#_{increment}$ has reached the upper limit, the deployment destination server determiner 156 causes the process to proceed to step S137. When $\#_{increment}$ has not reached the upper limit, the deployment destination server determiner 156 causes the process to proceed to step S134.

In step S134, the deployment destination server determiner 156 calculates $A=((SC_{per1c}\times(\#_{current}+\#_{increment}))+(TC_{per1c}\times(\#_{current}+\#_{increment}))/2)/(\text{total counts})$.

In step S135, the deployment destination server determiner 156 determines whether or not the calculated A is equal to or larger than the target value of Apdex. When the calculated A is equal to or larger than the target value of Apdex, the deployment destination server determiner 156 causes the process to proceed to step S137. When the calculated A is smaller than the target value of Apdex, the deployment destination server determiner 156 causes the process to proceed to step S136.

In step S136, the deployment destination server determiner 156 adds "1" to the value of "$\#_{increment}$" and causes the process to proceed to step S133.

In step S137, the deployment destination server determiner 156 determines the current value of "$\#_{increment}$" as the number of containers to be added.

After the deployment destination server determiner 156 determines the number of containers to be added, the deployment destination server determiner 156 determines a deployment destination server in which the determined number of containers to be added are to be deployed.

Figure 27:
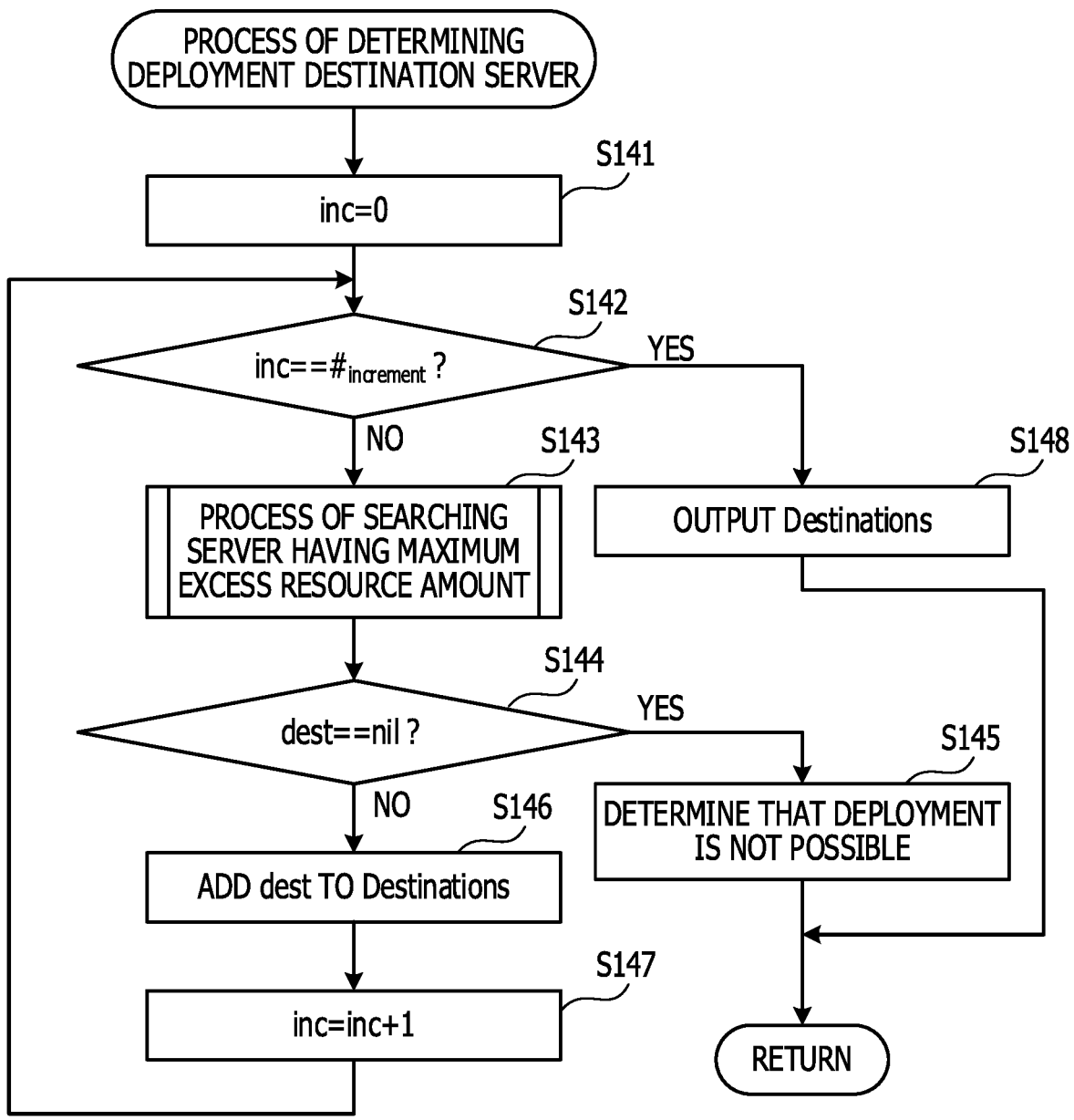
FIG. 27 is a flowchart of an example of a procedure for a process of determining a deployment destination server.

FIG. 27 is a flowchart of an example of the procedure for the process of determining a deployment destination server. The process illustrated in FIG. 27 is described below using steps.

In step S141, the deployment destination server determiner 156 sets, to an initial value "0", "inc" indicating the number of containers to be deployed in the determined destination server.

In step S142, the deployment destination server determiner 156 determines whether or not the value of "inc" is equal to the value of "$\#_{increment}$" indicating the number of containers to be added. When the value of "inc" is equal to the value of "$\#_{increment}$", the deployment destination server determiner 156 causes the process to proceed to step S148. When the value of "inc" is not equal to the value of "$\#_{increment}$", the deployment destination server determiner 156 causes the process to proceed to step S143.

In step S143, the deployment destination server determiner 156 executes a process of searching a server that will have the maximum excess resource amount after the addition of the determined number of containers. As a result of the process of searching the server that will have the maximum excess resource amount after the addition of the determined number of containers, "dest" indicating an identifier of the server that will have the maximum excess resource amount after the addition of the determined number of containers is obtained. When a server in which the determined number of containers to be added are to be deployed does not exist, the value of "dest" is "nil". The process of searching a server that will have the maximum excess resource amount after the addition of a determined number of containers is described later in detail (refer to FIG. 28).

In step S144, the deployment destination server determiner 156 determines whether or not the value of "dest" is "nil". When the value of "dest" is "nil", the deployment destination server determiner 156 causes the process to proceed to step S145. When the value of "dest" is not "nil", the deployment destination server determiner 156 causes the process to proceed to step S146.

In step S145, the deployment destination server determiner 156 determines that the deployment of the determined number of containers is not possible. Then, the deployment destination server determiner 156 terminates the process of determining a deployment destination server.

In step S146, the deployment destination server determiner 156 adds the value of "dest" to "Destinations" that is an array of an identifier of the deployment destination server.

In step S147, the deployment destination server determiner 156 adds 1 to the value of "inc" and causes the process to proceed to step S142.

In step S148, the deployment destination server determiner 156 outputs "Destinations" as a deployment destination server list.

In this manner, the deployment destination server in which the determined number of containers are to be deployed is determined. Next, the process of searching a server that will have the maximum excess resource amount after the addition of a determined number of containers is described.

Figure 28:
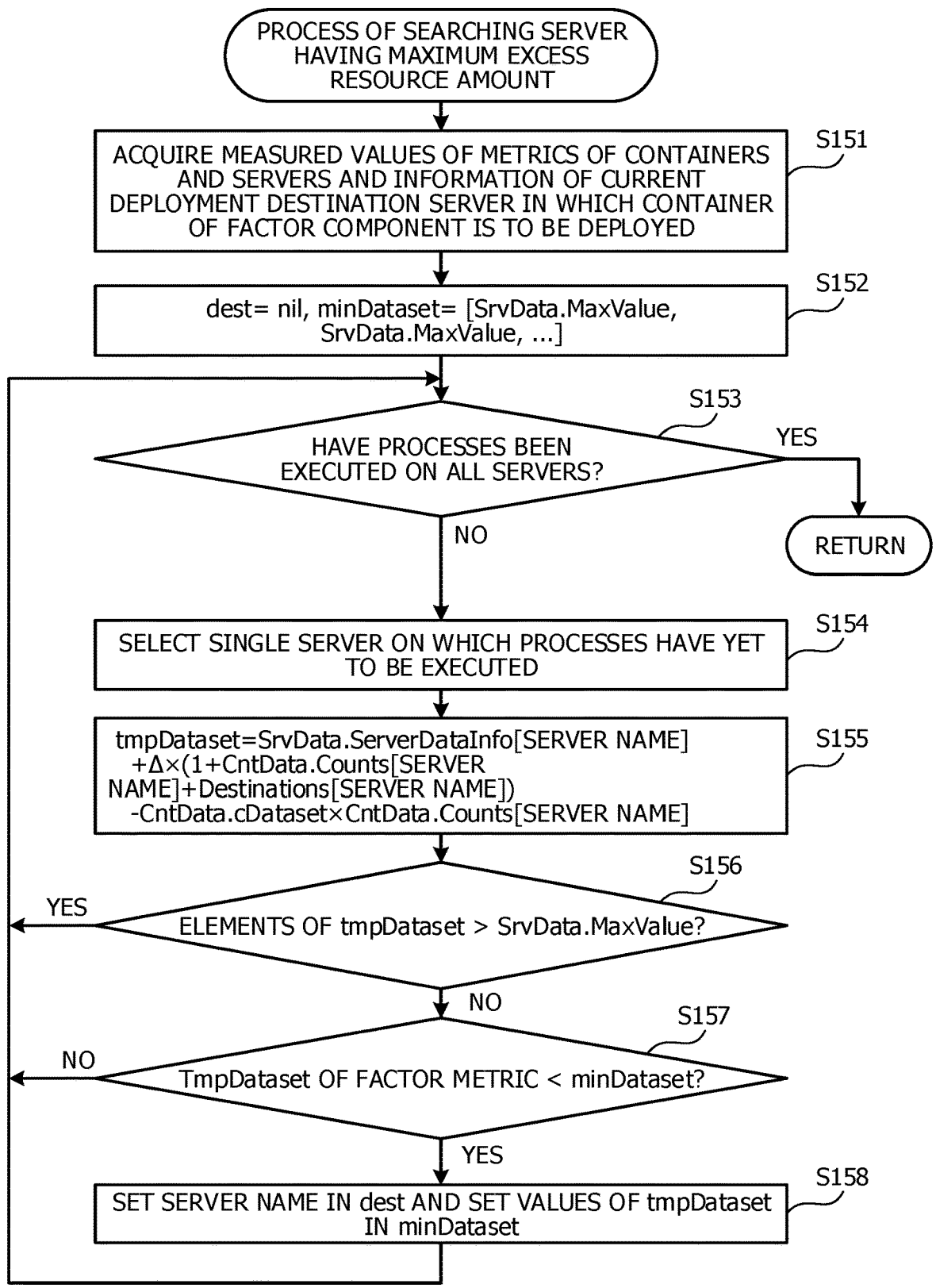
FIG. 28 is a flowchart of an example of a procedure for a process of searching a server that will have the maximum excess resource amount after the addition of a determined number of containers.

FIG. 28 is a flowchart of an example of a procedure for the process of searching a server that will have the maximum excess resource amount after the addition of a determined number of containers. The process illustrated in FIG. 28 is described below using steps.

In step S151, the deployment destination server determiner 156 acquires measured values of metrics of the containers and the servers from the metric information storage unit 120 and acquires, from the resource information storage unit 140, information of a current deployment destination server in which a container of the factor component is to be deployed. Then, the deployment destination server determiner 156 sets the measured data of the metrics in the following variable or array based on the acquired information. The measured data of each of the metrics is {metric name: (CntData, SrvData)}.

"CntData" is measured data of the containers that is related to a factor metric. For example, when the factor metric is "CPU utilization", "CntData" is measured values of CPU utilization of the containers. "CntData" is expressed by (Counts, cDataset). "Counts" indicates the number of factor containers (containers of the factor component) of each of the servers before the execution of the scale out process and is expressed by {server name: $\#_{container}$}. "cDataset" is metric values, measured in a collection time interval, of the factor containers and is an array of numerical values such as [0.2, 0.4, 0.1, . . . ]. Elements indicating metric values within "cDataset" are averages of measured values of the factor containers in the collection time interval and are normalized to up to "1".

"SrvData" is data on a server related to the factor metric. "SrvData" is expressed by (ServerDataInfo, MaxValue). "ServerDataInfo" is a measured value of the metric of the server and is expressed by [server name: sDataset]. "sDataset" is a metric value measured in the collection time interval and related to the server and is an array of numerical values such as [0.8, 0.5, 0.2, . . . ]. Elements indicating metric values in "sDataset" are averages values, measured in the collection time interval, of the factor containers and are normalized to up to "1". "MaxValue" is an upper limit of the metric for each resource and is acceptable after the addition of a container. The upper limit of the metric is a value normalized so that metric value is up to "1". For example, when a container is added to a server and CPU utilization of the server is suppressed and equal to or lower than 80%, an upper limit of the CPU utilization is set to "0.8".

In step S152, the deployment destination server determiner 156 initializes the value of "dest" to "nil". In addition, the deployment destination server determiner 156 sets, in "minDataset", multiple elements [SrvData.MaxValue, SrvData.MaxValue, . . . ] indicating an upper limit of the factor metric. "SrvData.MaxValue" of the factor metric is acceptable in a server indicated in measured data "SrvData" and indicates the upper limit "MaxValue" of the metric. For example, when the factor metric is CPU utilization, and the upper limit of the CPU utilization is 80% ("0.8" after the normalization), "minDataset" of the CPU utilization is [0.8, 0.8, . . . ]. The number of elements set in "minDataset" is equal to the number of elements of "sDataset" and the number of elements of "cDataset".

In step S153, the deployment destination server determiner 156 determines whether or not the processes of steps S154 to S157 have been executed on all the servers. When the processes of steps S154 to S157 have been executed on all the servers, the deployment destination server determiner 156 terminates the process of searching a server that will have the maximum excess resource amount after the addition of a determined number of containers. When the processes of steps S154 to S157 have not been executed on one or more of all the servers, the deployment destination server determiner 156 causes the process to proceed to step S154.

In step S154, the deployment destination server determiner 156 selects a single server on which the processes of steps S154 to S157 have yet to be executed.

In step 5155, the deployment destination server determiner 156 calculates, for each of resources of the selected server, "tmpDataset" indicating a resource amount to be consumed by the selected server when a single factor container is additionally deployed in the selected server. "tmpDataset" is calculated according to the following equation. tmpDataset=SrvData.ServerDataInfo[server name]+Δ×(1+CntData.Counts[server name] +Destinations[server name])−CntData.cDataset×CntData.Counts[server name].

"SrvData.ServerDataInfo[server name]" indicates a measured value of a metric of a server indicated by [server name]. "CntData.Counts[server name]" indicates the number of factor containers within the server indicated by [server name]. "Destinations[server name]" indicates the number of containers "CntData.cDataset" indicates a current metric value per container in a factor component. "CntData.Counts[server name]" indicates the number of factor containers currently deployed in the server indicated by [server name].

The items such as "SrvData.ServerDatainfo[server name] include multiple elements (multiple metric values measured in collection time intervals, for example). The deploy destination server determiner 156 calculates "tmpDataset" by using elements existing at the same place in the array. Thus, "tmpDataset" indicates a resource amount consumed by the selected server in time intervals in which a metric value is collected.

The deployment destination server determiner 156 calculates "tmpDataset" of the selected server for each of metrics, for example.

In step S156, the deployment destination server determiner 156 determines whether or not elements of "tmpDataset" calculated in each of the collection time intervals are larger than upper limits of metrics of elements indicated in "SrvData.MaxValue". This determination is executed on each of multiple resources. When one or more elements that are larger than corresponding upper limits indicated in "SrvData.MaxValue" are included in "tmpDataset" for one or more resources, the deployment destination server determiner 156 determines "YES" in step S156. When values of all the elements in "tmpDataset" are equal to or smaller than the upper limits indicated in "SrvData.MaxValue" for all the resources, the deployment destination server determiner 156 determines "NO" in step S156.

When the deployment destination server determiner 156 determines "YES" in step S156, the deployment destination server determiner 156 causes the process to proceed to step S153. When the deployment destination server determiner 156 determines "NO" in step 5156, the deployment destination server determiner 156 causes the process to proceed to step S157.

When a consumed amount of any of the resources in the server may exceed an upper limit due to the addition of a container in the process of step S156, the server is excluded from deployment destination servers in which containers are to be deployed.

In step S157, the deployment destination server determiner 156 compares "tempDataset" of the factor metric of the selected server with "minDataset" and determines whether or not "tmpDataset" is smaller than "minDataset". For example, an average of values of the elements in "tmpDataset" is smaller than an average of values of the elements in "minDataset", the deployment destination server determiner 156 determines that "tmpDataset" is smaller than "minDataset". When "tmpDataset" is smaller than "minDataset", the deployment destination server determiner 156 causes the process to proceed to step S158. When "tmpDataset" is equal to or larger than "minDataset", the deployment destination server determiner 156 causes the process to proceed to step S153.

In step S158, the deployment destination server determiner 156 sets the name of the selected server in "dest". In addition, the deployment destination server determiner 156 sets values of the elements of "tmpDataset" of the factor metric of the selected server in "minDataset". After that, the deployment destination server determiner 156 causes the process to proceed to step S153.

In the aforementioned manner, a server that will have the maximum excess resource amount after the addition of a determined number of containers is searched. The name of the server that will have the maximum excess resource amount after the addition of the determined number of containers is set in "dest". When a server for which "NO" is selected in step S156 and "YES" is selected in step 5157 is not detected, the value of "dest" remains to be "nil". The server name set in "dest" is set in "Destinations" in step S146 illustrated in FIG. 27. When a server in which a container to be added is to be deployed is identified as a deploy destination server, the name of the identified server in which the container to be added is to be deployed is set in "Destinations". When two or more containers are to be deployed in a single server, the name of the server is set in multiple elements of "Destinations".

As described above, in the second embodiment, in the scale out process executed to add a container of a factor component, the minimum number of containers to be added to satisfy the performance requirement for the service is calculated, and the calculated number of containers are automatically deployed. Thus, the efficiency of the scale out process is higher, compared with the case where the scale out process is executed to add containers one by one and whether or not the performance requirement is satisfied is confirmed every time the scale out process is executed. As a result, when the service does not satisfy the performance requirement, the scale out process may be executed early to enable the service to satisfy the performance requirement, and it may be possible to suppress a time period during which the quality of the service decreases. For example, if the scale out process is executed at time intervals of 1 hour, the number of containers to be added to enable the server to satisfy the performance requirement is 3, and the scale out process is executed to add the containers one by one, a time period during which the performance requirement is not satisfied is up to 3 hours. On the other hand, in the second embodiment, a time period during which the performance requirement is not satisfied is up to 1 hour.

In addition, the managing server 100 determines a server in which a container is to be deployed so that an excess resource amount of the server is as large as possible. This determination may cause loads of the multiple servers to be equal to each other and a processing efficiency of the entire system may be improved.

In addition, as illustrated in FIG. 20, when the managing server 100 adds a container to a server, the managing server 100 calculates an excess resource amount of the server based on a decrease in a load applied to the server due to a container already deployed in the server. Thus, the managing server 100 may calculate an accurate excess resource amount of the server. As a result, the managing server 100 may appropriately determine a server of which an excess resource amount is the largest.

Other Embodiments

In the second embodiment, the Apdex value is used as a standard for the determination of whether or not the service satisfies the performance requirement. Another index may be used as the standard for the determination. For example, the ratio of a process causing latency to exceed a predetermined value may be used as the standard for the determination.

In the second embodiment, when the difference between an operational state of a certain metric when the service satisfies the performance requirement and an operational state of the certain metric when the service does not satisfy the performance requirement is the largest among the metrics, the certain metric is used as a factor metric. However, the factor metric may be determined by another method. The factor metric may not be automatically determined. The administrator may determine a factor metric and enters the determined factor metric in the managing server.

Although the embodiments are described, the configurations of the units described in the embodiments may be replaced with other units having the same functions as the units described in the embodiments. In addition, another arbitrary constituent section and another arbitrary process may be added. Furthermore, arbitrary two or more of the configurations (features) described in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A performance adjustment method implemented by a computer, the method comprising:

executing, by a processor of the computer, first processing that includes causing any of a plurality of servers to provide a service by executing a plurality of software components, the service being configured to be provided by aggregating each processing associated with each software component, each of the plurality of software components being configured to perform an associated processing from among aggregated processing of the service;

executing, by the processor of the computer, second processing periodically after the executing of the first processing, the second processing including acquiring performance information indicating first performance of the service;

executing, by the processor of the computer, third processing in response to the executing of the second processing, the third processing including determining whether the first performance indicated by the performance information satisfies a performance requirement of the service, the performance requirement indicating second performance with respect to the service; and executing, by the processor of the computer, fourth processing in response to a determination result indicating that the first performance does not satisfy the performance requirement of the service, the fourth processing including acquiring, for each of the plurality of software components, first status information indicating a first measurement value corresponding to a current operating status of the respective software component measured in response to the determination result, acquiring, for each of the plurality of software components, a difference between the first status information and second status information, the second status information indicating a second measurement value corresponding to a normal operating status of the respective software component, the second measurement value being a value that has been measured when the determination result indicates that the first performance satisfy the performance requirement of the service, determining, by using the difference acquired for each of the plurality of software components, a first software component from among the plurality of software components associate with the service, the first software component being a software component having a maximum difference from among the difference acquired for each of the plurality of software components, and allocating the determined first software component to a computing resource selected from among the plurality of servers to satisfy the performance requirement of the service.

2. The performance adjustment method according to claim 1, wherein the fourth processing is configured to calculate a contribution degree indicating a contribution to a performance value by dividing a service performance value calculated from the performance information of the service by a current number of the computing resource allocated to the first software component, and determine a first minimum integer as an additional number of the computing resource to be newly allocated to the first software component, the first minimum integer being a minimum value of integer complying with a condition that a result of multiplying a first value by the contribution degree is equal to or larger than a threshold based on the performance requirement of the service, the first value being obtained by adding the integer to the current number.

3. The performance adjustment method according to claim 2, further comprising:

executing fifth processing that includes selecting the computing resource from among the plurality of servers in accordance with the first minimum integer corresponding to the additional number of the computing resource, and allocating the first software component to the selected computing resource to cause the selected computing resource to perform the processing associated with the first software component.

4. The performance adjustment method according to claim 3, wherein the fifth processing is configured to determine, as the selected computing resource, a server that has a maximum excess resource amount when the determination result indicating that the first performance does not satisfy the performance requirement of the service is detected.

5. The performance adjustment method according to claim 4, wherein the fifth processing is configured to calculate, for each of the plurality of servers, a first resource amount by dividing a total amount by a second value, the second value being obtained by adding the current number of the computing resource allocated to the first software component to the additional number of the computing resource, the total amount being a resource amount consumed by the plurality of software components associated with the service, and calculate, for each of the plurality of servers, an excess resource amount in accordance with the calculated first resource amount of the respective server, the excess resource amount corresponding to a resource amount that is a remaining amount among a total resource amount of the respective server.

6. The performance adjustment method according to claim 1, the performance adjustment method further comprising:

executing sixth processing in response to the determination result indicating that the first performance satisfies the performance requirement of the service, the fourth processing including measuring, for each of the plurality of software components, the second measurement value as the normal operating status of the respective software component, and storing, into a storage, the second measurement value as the second status information.

7. A non-transitory computer-readable storage medium for storing a program which causes a processor to perform processing for performance adjustment, the processing comprising:

executing first processing that includes causing any of a plurality of servers to provide a service by executing a plurality of software components, the service being configured to be provided by aggregating each processing associated with each software component, each of the plurality of software components being configured to perform an associated processing from among aggregated processing of the service;

executing second processing periodically after the executing of the first processing, the second processing including that includes acquiring performance information indicating first performance of the service;

executing third processing in response to the executing of the second processing, the third processing including determining whether the first performance indicated by the performance information satisfies a performance requirement of the service, the performance requirement indicating second performance with respect to the service; and executing fourth processing in response to a determination result indicating that the first performance does not satisfy the performance requirement of the service, the fourth processing including acquiring, for each of the plurality of software components, first status information indicating a first measurement value corresponding to a current operating status of the respective software component measured in response to the determination result, acquiring, for each of the plurality of software components, a difference between the first status information and second status information, the second status information indicating a second measurement value corresponding to a normal operating status of the respective software component, the second measurement value being a value that has been measured when the determination result indicates that the first performance satisfy the performance requirement of the service, determining, by using the difference acquired for each of the plurality of software components, a first software component from among the plurality of software components associate with the service, the first software component being a software component having a maximum difference from among the difference acquired for each of the plurality of software components, and allocating the determined first software component to a computing resource selected from among the plurality of servers to satisfy the performance requirement of the service.

8. The non-transitory computer-readable storage medium according to claim 7, wherein the fourth processing is configured to calculate a contribution degree indicating a contribution to a performance value by dividing a service performance value calculated from the performance information of the service by a current number of the computing resource allocated to the first software component, and determine a first minimum integer as a number of the computing resource to be newly allocated to the first software component, the first minimum integer being a minimum value of integer complying with a condition that a result of multiplying a first value by the contribution degree is equal to or larger than a threshold based on the performance requirement of the service, the first value being obtained by adding the integer to the current number.

9. The non-transitory computer-readable storage medium according to claim 8, wherein the processing further comprises:

executing fifth processing that includes selecting the computing resource from among the plurality of servers in accordance with the first minimum integer, and allocating the first software component to the selected computing resource to cause the selected computing resource to perform the processing associated with the first software component.

10. The non-transitory computer-readable storage medium according to claim 9, wherein the fifth processing is configured to determine, as the selected computing resource, a server that has a maximum excess resource amount when the determination result indicating that the first performance does not satisfy the performance requirement of the service is detected.

11. The non-transitory computer-readable storage medium according to claim 10, wherein the fifth processing is configured to calculate, for each of the plurality of servers, a first resource amount by dividing a total amount by a second value, the second value being obtained by adding the current number of the computing resource allocated to the first software component to the additional number of the computing resource, the total amount being a resource amount consumed by the plurality of software components associated with the service, and calculate, for each of the plurality of servers, an excess resource amount in accordance with the calculated first resource amount of the respective server, the excess resource amount corresponding to a resource amount that is a remaining amount among a total resource amount of the respective server.

12. The non-transitory computer-readable storage medium according to claim 7, wherein the processing further comprises:

executing sixth processing in response to the determination result indicating that the first performance satisfies the performance requirement of the service, the fourth processing including measuring, for each of the plurality of software components, the second measurement value as the normal operating status of the respective software component, and storing, into a storage, the second measurement value as the second status information.

13. An apparatus for performance adjustment, the apparatus comprising:

a memory; and processor circuitry coupled to the memory and configured to:

execute first processing that includes causing any of a plurality of servers to provide a service by executing a plurality of software components, the service being configured to be provided by aggregating each processing associated with each software component, each of the plural plurality of software components being configured to perform an associated processing from among aggregated processing of the service;

execute second processing periodically after the executing of the first processing, the second processing including acquiring performance information indicating first performance of the service;

execute third processing in response to the executing of the second processing, the third processing including determining whether the first performance indicated by the performance information satisfies a performance requirement of the service, the performance requirement indicating second performance with respect to the service; and execute fourth processing in response to a determination result indicating that the first performance does not satisfy the performance requirement of the service, the fourth processing including acquiring, for each of the plurality of software components, first status information indicating a first measurement value corresponding to a current operating status of the respective software component measured in response to the determination result, acquiring, for each of the plurality of software components, a difference between the first status information and second status information, the second status information indicating a second measurement value corresponding to a normal operating status of the respective software component, the second measurement value being a value that has been measured when the determination result indicates that the first performance satisfy the performance requirement of the service, determining, by using the difference acquired for each of the plurality of software components, a first software component from among the plurality of software components associate with the service, the first software component being a software component having a maximum difference from among the difference acquired for each of the plurality of software components, and allocating the determined first software component to a computing resource selected from among the plurality of servers to satisfy the performance requirement of the service.

14. The apparatus according to claim 13, wherein the fourth processing is configured to calculate a contribution degree indicating a contribution to a performance value by dividing a service performance value calculated from the performance information of the service by a current number of the computing resource allocated to the first software component, and determine a first minimum integer as a number of the computing resource to be newly allocated to the first software component, the first minimum integer being a minimum value of integer complying with a condition that a result of multiplying a first value by the contribution degree is equal to or larger than a threshold based on the performance requirement of the service, the first value being obtained by adding the integer to the current number.

15. The apparatus according to claim 14, wherein the processor circuitry is further configured to:

execute fifth processing that includes selecting the computing resource from among the plurality of servers in accordance with the first minimum integer, and allocating the first software component to the selected computing resource to cause the selected computing resource to perform the processing associated with the first software component.

16. The apparatus according to claim 15, wherein the fifth processing is configured to determine, as the selected computing resource, a server that has a maximum excess resource amount when the determination result indicating that the first performance does not satisfy the performance requirement of the service is detected.

17. The apparatus according to claim 16, wherein the fifth processing is configured to calculate, for each of the plurality of servers, a first resource amount by dividing a total amount by a second value, the second value being obtained by adding the current number of the computing resource allocated to the first software component to the additional number of the computing resource, the total amount being a resource amount consumed by the plurality of software components associated with the service, and calculate, for each of the plurality of servers, an excess resource amount in accordance with the calculated first resource amount of the respective server, the excess resource amount corresponding to a resource amount that is a remaining amount among a total resource amount of the respective server.

18. The apparatus according to claim 13, wherein the processor circuitry is further configured to execute sixth processing in response to the determination result indicating that the first performance satisfies the performance requirement of the service, the fourth processing including measuring, for each of the plurality of software components, the second measurement value as the normal operating status of the respective software component, and storing, into a storage, the second measurement value as the second status information.

* * * * *